(12) United States Patent
Nakata et al.

(10) Patent No.: US 10,552,039 B2
(45) Date of Patent: Feb. 4, 2020

(54) STORAGE CONTROL APPARATUS, STORAGE MANAGEMENT SYSTEM, AND NON-TRANSITORY COMPUTER-READABLE STORAGE MEDIUM

(71) Applicant: FUJITSU LIMITED, Kawasaki-shi, Kanagawa (JP)

(72) Inventors: Natsumi Nakata, Kawasaki (JP); Toshiharu Makida, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/852,930

(22) Filed: Dec. 22, 2017

(65) Prior Publication Data
US 2018/0181313 A1 Jun. 28, 2018

(30) Foreign Application Priority Data
Dec. 28, 2016 (JP) .................................. 2016-256422

(51) Int. Cl.
G06F 12/00 (2006.01)
G06F 3/06 (2006.01)

(52) U.S. Cl.
CPC ............ *G06F 3/0607* (2013.01); *G06F 3/065* (2013.01); *G06F 3/067* (2013.01); *G06F 3/0634* (2013.01); *G06F 3/0652* (2013.01); *G06F 3/0665* (2013.01); *G06F 3/0689* (2013.01)

(58) Field of Classification Search
CPC .... G06F 3/0607; G06F 3/0634; G06F 3/0646; G06F 3/0647; G06F 3/065; G06F 3/0652; G06F 3/0665; G06F 3/067; G06F 3/0689
See application file for complete search history.

(56) References Cited

U.S. PATENT DOCUMENTS 9,280,578 B1 * 3/2016 Zhou .................. G06F 16/1865
2003/0051111 A1 3/2003 Nakano et al.
2005/0216523 A1 9/2005 Sakaguchi et al.

FOREIGN PATENT DOCUMENTS

| JP | 10-187514 | 7/1998 |
| JP | 2003-122509 | 4/2003 |
| JP | 2005-276094 | 10/2005 |

* cited by examiner

*Primary Examiner* — Shawn X Gu
(74) *Attorney, Agent, or Firm* — Fujitsu Patent Center

(57) ABSTRACT

A storage control apparatus including a memory and a processor coupled to the memory and the processor configured to execute a process, the process including storing, in the memory, management information including an operation history for a storage region of a storage device, specifying at certain timing, from the management information, a first operation that has been executed to set a configuration of the storage region to a configuration at the certain timing, determining a second operation from among operations, in the management information, that precede the execution of the first operation and that target the storage region, deleting the second operation from the management information, and transmitting the management information after the deletion to a management apparatus that manages a state of the storage region of the storage device.

8 Claims, 19 Drawing Sheets

FIG. 4

| ITEM | REMARKS | | |
|---|---|---|---|
| STORAGE<br>  DETAIL INFORMATION<br>  RELATED INFORMATION | REGISTRATION STORAGE LIST POINTER | | |
| | NAME | ADDRESS | STATE |
| | STORAGE 202 | 192.168.2.2 | OPERATIVE |
| | STORAGE 302 | 192.168.3.2 | INOPERATIVE |

MANAGEMENT UI — 101a

FIG. 5

| ITEM | REMARKS | | | |
|---|---|---|---|---|
| ─ RAIDG<br>  ─ DETAIL<br>    INFORMATION<br>  ─ RELATED<br>    INFORMATION<br>─ STORAGE | RAID GROUP LIST (STORAGE 202)<br><br>POINTER | | | |
| | NAME | RAID TYPE | SIZE | STATE |
| | RAIDG #21 | RAID 1 | 100GB | AVAILABLE |
| | RAIDG #22 | RAID 1 | 200GB | AVAILABLE |

MANAGEMENT UI — 101b

FIG. 6

| ITEM | REMARKS | | | | |
|---|---|---|---|---|---|
| VOL<br>　DETAIL<br>　INFORMATION<br>　RELATED<br>　INFORMATION<br>　RAIDG<br>　STORAGE | Volume LIST (RAIDG #21) | | | | |
| | NAME | VOL TYPE | SIZE | ENCRYPTION | STATE |
| | VOL #21A | TPV | 40GB | NO | AVAILABLE |
| | VOL #21B | FTV | 60GB | NO | AVAILABLE |

MANAGEMENT UI — 101c

FIG. 11

| STATE | | | EXTRACTION CONDITION | COMPRESSION |
|---|---|---|---|---|
| MANAGEMENT APPARATUS | STORAGE APPARATUS | COMMUNICATION PATH | | |
| OPERATIVE | INOPERATIVE | NORMAL | ACTIVATION OF STORAGE APPARATUS | ON |
| INOPERATIVE | OPERATIVE | NORMAL | ACTIVATION OF MANAGEMENT APPARATUS | ON |
| OPERATIVE | OPERATIVE | ABNORMAL | RESTORATION OF COMMUNICATION PATH | ON |
| OPERATIVE | OPERATIVE | NORMAL | SYNCHRONIZATION REQUEST BY MANAGEMENT APPARATUS | ON |
| OPERATIVE | OPERATIVE | NORMAL | COMMAND INPUT (STORAGE APPARATUS SIDE) | OFF |

STORAGE CONTROL APPARATUS, STORAGE MANAGEMENT SYSTEM, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-256422, filed on Dec. 28, 2016, the entire contents of which are incorporated herein by reference.

FIELD

The present embodiment relates to a storage control apparatus, a storage management system, and a non-transitory computer-readable storage medium.

BACKGROUND

A storage system is available in which a plurality of storage apparatus that incorporates a hard disk drive (HDD), a solid state drive (SSD) or the like are centrally managed by a management server. The management server is coupled to a plurality of storage apparatus through a network such as a LAN (Local Area Network). Each storage apparatus retains management information for managing a storage region such as a logical volume. The management server manages the state of the individual storage apparatus utilizing a management table including the substance of management information retained by the individual storage apparatus.

An operation for a storage region of a storage apparatus is either performed from a management server or is performed directly for the storage apparatus. Where an operation for a storage region is performed directly for a storage apparatus, synchronization of the management information is carried out between the storage apparatus and the management server after the operation. As the synchronization method of management information, for example, a method in which the storage apparatus notifies the management server of the substance of the operation in response to a synchronization request that is periodically issued from the management server and a method in which, after the operation, the storage apparatus voluntarily notifies the management server of the substance of the operation are available.

It is to be noted that, as regards a method for matching the substance of a database, a method has been proposed in which, for example, a difference value between the database upon last matching and the database upon current matching is determined and is used to match the database. Further, a method has been proposed in which a plurality of storage apparatus is separated into a plurality of groups and file management databases of storage apparatus are synchronized with each other for each group. Furthermore, a method has been proposed in which data synchronization is carried out between datacenters the distance between which is small whereas asynchronous remote copying is carried out between datacenters the distance between which is great.

Examples of the related art include Japanese Laid-open Patent Publication No. 10-187514, Japanese Laid-open Patent Publication No. 2005-276094, and Japanese Laid-open Patent Publication No. 2003-122509.

SUMMARY

According to an aspect of the embodiment, a storage control apparatus including a memory and a processor coupled to the memory and the processor configured to execute a process, the process including storing, in the memory, management information including an operation history for a storage region of a storage device, specifying at certain timing, from the management information, a first operation that has been executed to set a configuration of the storage region to a configuration at the certain timing, determining a second operation from among operations, in the management information, that precede the execution of the first operation and that target the storage region, deleting the second operation from the management information, and transmitting the management information after the deletion to a management apparatus that manages a state of the storage region of the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a view depicting an example of a management user interface (UI, registration storage list) according to the second embodiment;

FIG. 5 is a view depicting an example of another management UI (redundant arrays of inexpensive disks (RAID) Group list) according to the second embodiment;

FIG. 6 is a view depicting an example of a further management UI (Volume list) according to the second embodiment;

FIG. 11 is a view illustrating an execution condition for a synchronization process according to the second embodiment;

DESCRIPTION OF EMBODIMENTS

When information of a database or the like is synchronized, the process burden by synchronization may be reduced by carrying out synchronization utilizing a difference. Further, when the synchronization substance is exchanged through a network, if a difference is utilized, the communication load may be reduced. However, in a situation in which the period of time until synchronization is completed becomes long and a large amount of differences may possibly be accumulated, even if a method that utilizes a difference in synchronization is adopted, there still is a risk that a long period of time is required for communication.

According to one aspect, it is an object of the present disclosure to provide a storage controlling apparatus, a storage management system and a program that may reduce the period of time required for communication of management information.

In the following, embodiments of the present technology are described with reference to the accompanying drawings. It is to be noted that elements having substantially same functions are denoted by same reference symbols in the present specification and the accompanying drawings, and overlapping description of them is sometimes omitted herein.

<1. First Embodiment>

Figure 1:
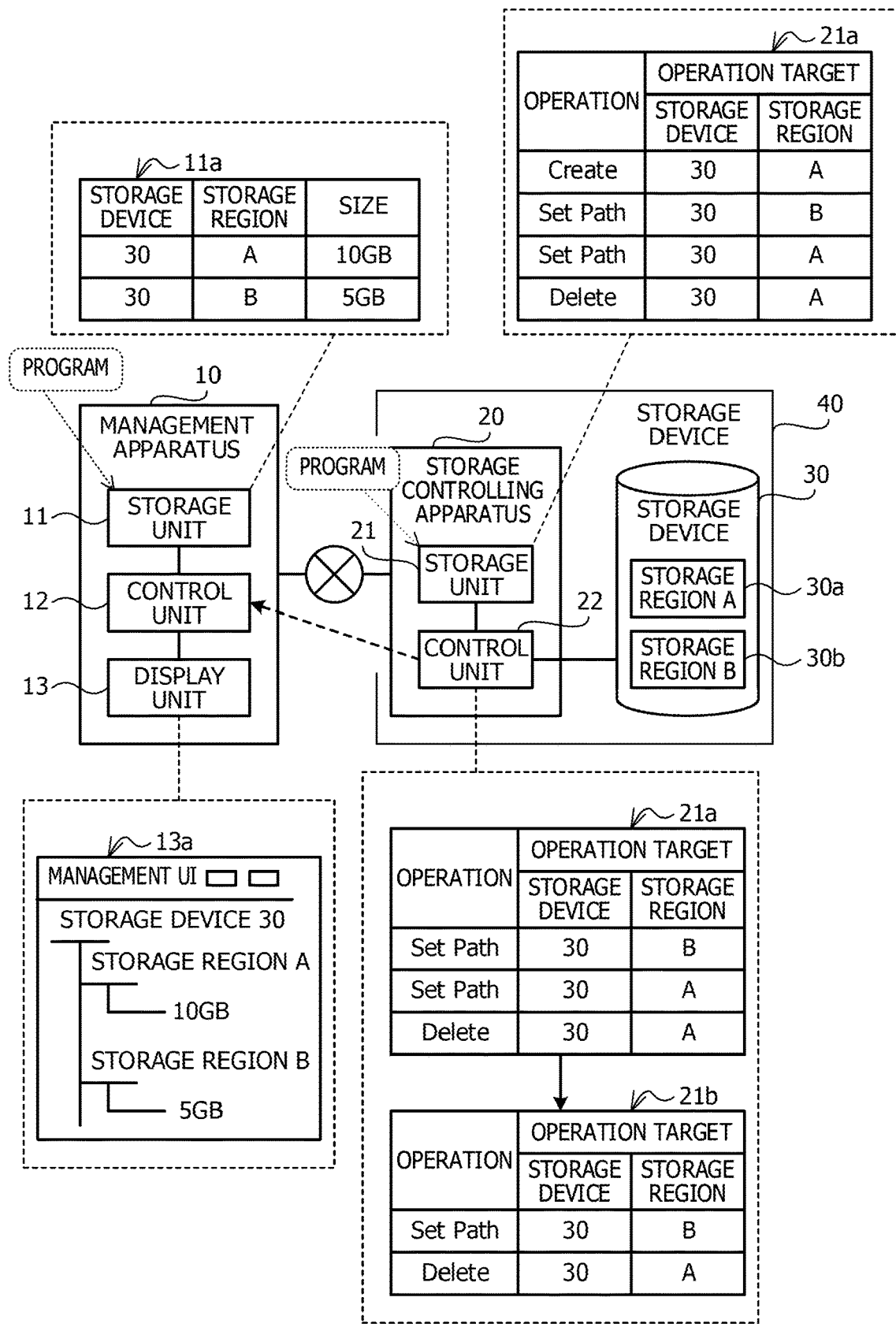
FIG. 1 is a view depicting an example of a storage management system according to a first embodiment.

A first embodiment is described with reference to FIG. 1. The first embodiment relates to a contrivance that reduces the period of time required for transmission and reception of management information carried out between a storage apparatus and a management apparatus that manages the storage apparatus. FIG. 1 is a view depicting an example of a storage management system according to a first embodiment.

As depicted in FIG. 1, the storage management system according to the first embodiment includes a management apparatus 10, a storage controlling apparatus 20 and a storage device 30. It is to be noted that the storage controlling apparatus 20 and the storage device 30 operate as a storage apparatus 40. Further, although the storage management system of the example of FIG. 1 includes only one storage apparatus 40 for the convenience of description and illustration, the storage management system according to the first embodiment may possibly include two or more storage apparatus.

The management apparatus 10 is a computer such as a personal computer (PC) or a server apparatus. The management apparatus 10 includes a storage unit 11, a control unit 12 and a display unit 13.

The storage unit 11 is a volatile storage device such as a random access memory (RAM) or a nonvolatile storage device such as an HDD or a flash memory. The control unit 12 is a processor such as a central processing unit (CPU), a digital signal processor (DSP), an application specific integrated circuit (ASIC) or a field programmable gate array (FPGA). The control unit 12 executes a program stored, for example, in the storage unit 11 or some other memory. The display unit 13 is a display apparatus such as a liquid crystal display (LCD) device or an electro-luminescence display (ELD) device.

The storage controlling apparatus 20 includes a storage unit 21 and a control unit 22.

The storage unit 21 is a volatile storage device such as a random access memory (RAM) or a nonvolatile storage device such as an HDD or a flash memory. The control unit 22 is a processor such as a CPU, a DSP, an ASIC or an FPGA. The control unit 22 executes a program stored, for example, in the storage unit 21 or some other memory.

The storage controlling apparatus 20 is coupled to the storage device 30. The storage device 30 is a recording medium of an HDD or an SSD or a RAID apparatus in which a plurality of recording media is combined for redundancy. In the storage device 30, at least one storage regions is set.

In the example of FIG. 1, storage regions 30a and 30b are set in the storage device 30. The storage regions 30a and 30b are, for example, RAID groups or logical volumes set to RAID groups. It is to be noted that each of the storage regions 30a and 30b is represented as storage region A or B, respectively, for the convenience of description.

In the storage unit 11 of the management apparatus 10, information of a management table 11a that is used for management of the storage device 30 in the storage apparatus 40 is stored. In the example of FIG. 1, information regarding the storage device 30 and the storage regions A and B (in the example in FIG. 1, the size of the storage regions A and B) is included in the management table 11a.

In the storage unit 21 of the storage controlling apparatus 20, management information 21a indicative of an operation history for the storage regions A and B of the storage device 30 is stored. In the example of FIG. 1, an operation (Set Path) for setting a path for the storage regions A and B and an operation (Delete) for deleting the storage region A are included in the management information 21a.

If, for example, an operation for at least one of the storage regions A and B is carried out, the control unit 22 of the storage controlling apparatus 20 notifies the management apparatus 10 of the substance of the operation. The control unit 12 of the management apparatus 10 receiving this notification updates the management table 11a based on the notified substance of the operation. However, when the power supply to the management apparatus 10 is off (power off) or when the communication between the management apparatus 10 and the storage controlling apparatus 20 is in a cutoff state (communication cutoff), the control unit 22 of the storage controlling apparatus 20 adds the operation substance to the management information 21a.

If exchange of information between the management apparatus 10 and the storage controlling apparatus 20 becomes possible from a power off situation or a communication cutoff situation, the control unit 22 of the storage controlling apparatus 20 transmits the management information 21a to the management apparatus 10. Then, the management table 11a in the storage unit 11 of the management apparatus 10 is updated based on the management information 21a, the compatibility between the current situation of the storage regions A and B and the substance of the management table 11a is secured. It is to be noted that the management information 21a may be transmitted, for example, in response to a transmission request issued from the management apparatus 10 or may be transmitted voluntarily by the storage controlling apparatus 20.

The display unit 13 of the management apparatus 10 displays the substance of the management table 11a. For example, the display unit 13 displays a management UI 13a on a screen. The management UI 13a is a display interface that is used by a manager, who utilizes the management apparatus 10, to refer to the information of the storage regions A and B and operate settings of the storage regions A and B and so forth. The information of the management UI 13a is updated in response to the updating of the management table 11a. Therefore, it is demanded for the substance of the management table 11a to reflect the current situation of the storage regions A and B on the real time basis.

However, if power off or communication cutoff prolongs, the number of the operation substances to be accumulated as the management information 21a becomes a great number. In such a situation as just described, transmission of the management information 21a or updating of the management table 11a based on the management information 21a requires much time, and there is a risk that the display substance of the management UI 13a and the current situation of the storage regions A and B are placed into a diverged state. Therefore, the control unit 22 of the storage controlling apparatus 20 compresses the data amount of the management information 21a in accordance with the following procedure.

First, the control unit 22 specifies a first operation that sets the state of the storage regions 30a and 30b to a state at present from within the management information 21a. In the example of FIG. 1, a state in which the storage region A does not exist (state at present) has been implemented by an operation (Delete) for deleting the storage region A. Therefore, the control unit 22 specifies an operation for deleting the storage region A as the first operation relating to the storage region A.

It is to be noted that the type of an operation to be specified as the first operation may be set in advance. For example, an operation for deleting a storage region, an operation for changing the name of a storage region, an operation for changing the size of a storage region, or an operation for an attribute (allocation of the capacity or the like) of a storage region may be set as a type of the first operation. In this case, information indicative of the type of a first operation is stored into the storage unit 21 of the storage controlling apparatus 20.

The control unit 22 that has specified the first operation for the storage region A specifies operations targeting the storage region A (in the example of FIG. 1, a setting operation of a path for the storage region A) from among the operations performed prior to the first operation. Then, the control unit 22 extracts, from among the specified operations, an operation or operations that do not have an influence on an operation result by the first operation as second operations from the management information 21a.

In the example of FIG. 1, since the first operation is deletion of the storage region A, all of the operations for the storage region A have no influence on a result of the deletion operation. In this case, the control unit 22 extracts a setting operation of a path for the storage region A as the second operation. Then, the control unit 22 deletes the second operation from the management information 21a. Since the second operation is deleted from the management information 21a, the data amount of the management information 21a is compressed.

Also for a different storage region (in the example of FIG. 1, the storage region B), specification of a first operation and a second operation and deletion of the second operation are carried out similarly. However, in the example of FIG. 1, since only a setting operation of a path is the operation for the storage region B, there is no second operation relating to the storage region B, and only the operation substance relating to the storage region A is deleted from the management information 21a. After all second operations are deleted, the control unit 22 transmits the management information 21a after the deletion to the management apparatus 10.

As described above, by leaving the minimal operation substances representative of the current situation of the storage regions A and B in the management information 21a while the remaining operation substances are deleted, the data amount of the management information 21a may be compressed. Even if this compression is performed, this does not have any influence on a result of updating of the management table 11a and besides the time required for transmission of the management information 21a and updating of the management table 11a based on the management information 21a may be reduced. As a result, it is possible to reflect the situation of the storage regions A and B on the real time basis on the substance of the management UI 13a.

The first embodiment is such as described above.

<2. Second Embodiment>

Now, a second embodiment is described. The second embodiment relates to a contrivance that reduces the period of time required for communication of management information carried out between a storage apparatus and a management apparatus that manages the storage apparatus.

[2-1. Storage Management System]

Figure 2:
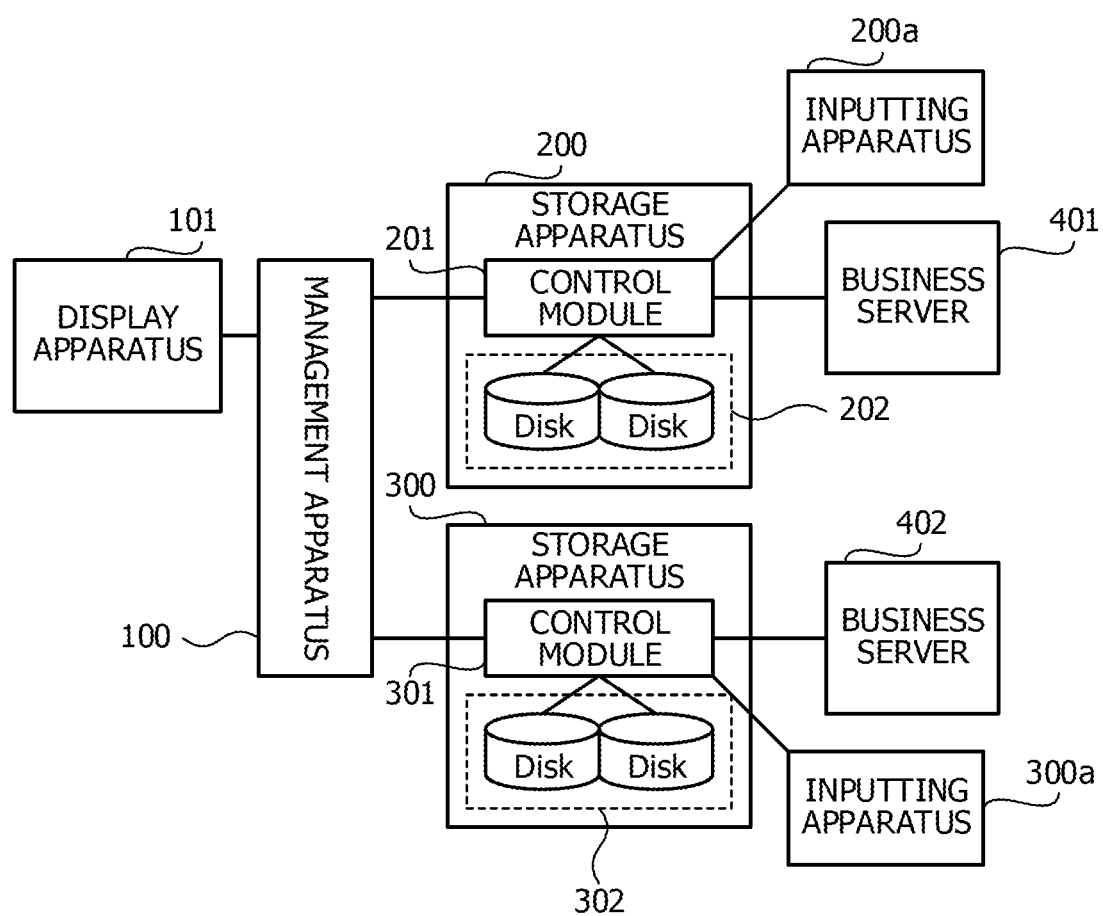
FIG. 2 is a view depicting an example of a storage management system according to a second embodiment.

A storage management system according to the second embodiment is described with reference to FIG. 2. FIG. 2 is a view depicting an example of a storage management system according to a second embodiment.

As depicted in FIG. 2, the storage management system according to the second embodiment includes a management apparatus 100, storage apparatus 200 and 300, and business servers 401 and 402. A display apparatus 101 is coupled to the management apparatus 100. Inputting apparatus 200a and 300a are coupled to the storage apparatus 200 and 300, respectively.

The display apparatus 101 is a display device such as an LCD display device or an ELD display device. The management apparatus 100 and the business servers 401 and 402 are computers such as a PC or a server apparatus. Each of the inputting apparatus 200a and 300a is an input interface such as a keyboard, a touch panel, a mouse, or a keypad. The management apparatus 100 and the storage apparatus 200 and 300 are coupled to each other through a network such as a LAN.

The storage apparatus 200 includes a control module (CM) 201 and a storage 202. The control module 201 includes a processor such as a CPU or an FPGA and a memory such as a RAM. The storage 202 is, for example, a disk of an HDD or a RAID apparatus in which a plurality of recording media is combined for redundancy. In the following description, it is assumed that the storage 202 is a RAID apparatus for the convenience of description.

The storage apparatus 300 includes a control module (CM) 301 and a storage 302. The control module 301 includes a processor such as a CPU or an FPGA, and a memory such as a RAM. The storage 302 is, for example, a disk of an HDD or a RAID apparatus in which a plurality of disks is combined for redundancy. In the following description, it is assumed that the storage 302 is a RAID apparatus for the convenience of description.

To each of the storages 202 and 302, at least one RAID group is set which causes a plurality of HDDs to be logically considered as one HDD. It is to be noted that this similarly applies also to a case in which devices (SSDs or the like) other than an HDD are utilized. Further, to the RAID group, at least one logical volume is set. For example, the RAID group is divided into a plurality of logical unit numbers (LUNs). Then, the business servers 401 and 402 execute business processing utilizing the logical volumes of the storages 202 and 302, respectively.

An operation relating to management of the storage apparatus 200 and 300 such as use permission (registration) of the storages 202 and 302, setting of a RAID group, or setting of a logical volume is performed from the management apparatus 100. Also it is possible for an operation relating to management of the storage apparatus 200 and 300 to be performed from the inputting apparatus 200a and 300a, respectively. Therefore, also when the power supply to the management apparatus 100 is off or when communication between the management apparatus 100 and the storage apparatus 200 and 300 is interrupted, management of the storage apparatus 200 and 300 may be performed.

However, where an operation is performed from the inputting apparatus 200a or 300a, the operation substance is conveyed to the management apparatus 100, and the information (management table) for managing the situation of the storages 202 and 302 is synchronized between the management apparatus 100 and the storage apparatus 200 and 300. The second embodiment relates to a contrivance for reducing the period of time required for the synchronization.

(Management Table and Hierarchical Structure of Resources)

Figure 3:
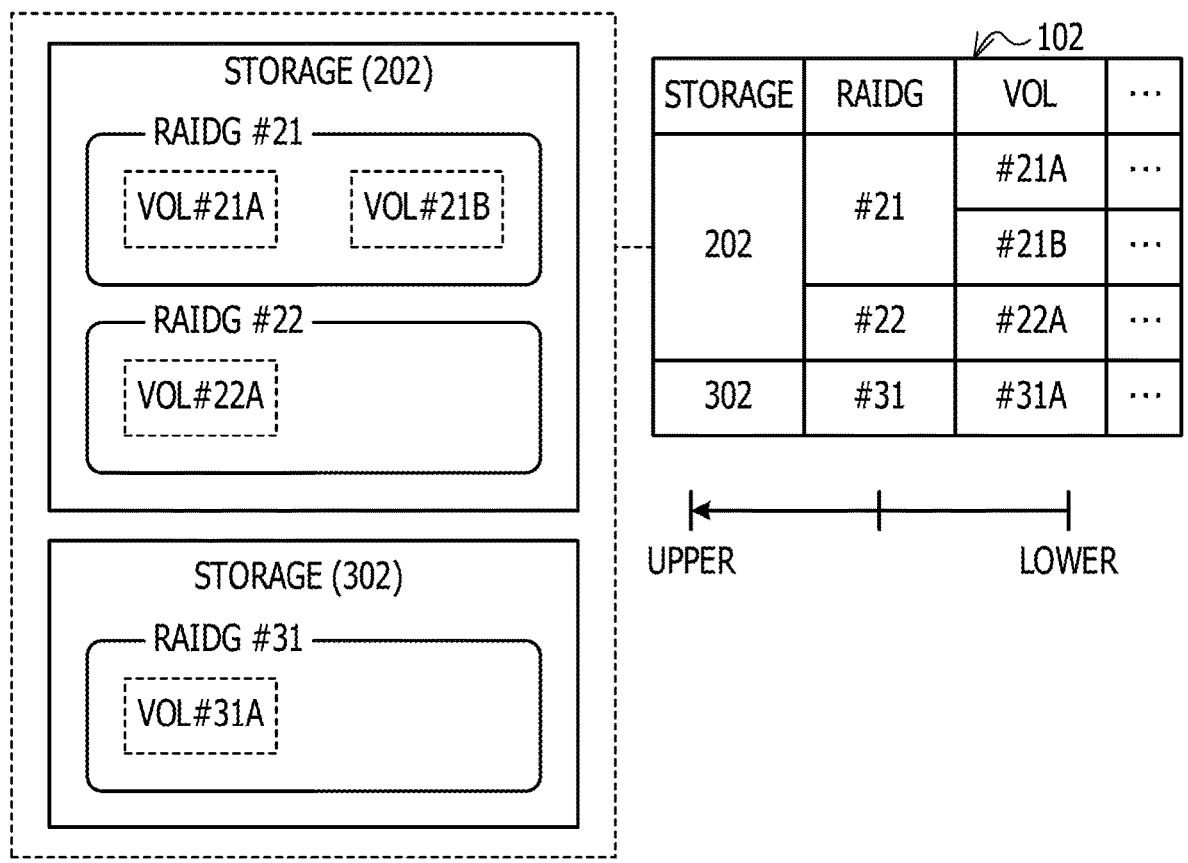
FIG. 3 is a view illustrating a management table and a hierarchical structure of resources according to the second embodiment.

Here, a management table 102 utilized for management of the storages 202 and 302 and a hierarchical structure of resources are described with reference to FIG. 3. FIG. 3 is a view illustrating a management table and a hierarchical structure of resources according to the second embodiment. It is to be noted that storages, RAID groups and logical volumes are sometimes referred to as resources as a whole.

As depicted in FIG. 3, the management table 102 includes identification information of a storage, identification information of a RAID group (RAIDG) and identification information of a logical volume (VOL). Further, the management table 102 includes information relating to a state or the substance of a setting of a storage, a RAID group and a logical volume. Since the RAID group is set to the storage, the storage is an upper hierarchy to the RAID group. Further, since the logical volume is set to the RAID group, the RAID group is an upper hierarchy to the logical volume.

In the example of FIG. 3, RAIDG #21 and RAIDG #22 are set to the storage 202, and RAIDG #31 is set to the storage 302. Further, VOL #21A and VOL #21B are set to RAIDG #21, and VOL #22A is set to the RAIDG #22. Further, VOL #31A is set to RAIDG #31.

Accordingly, in the example of FIG. 3, the storages 202 and 302 form the top hierarchy; VOL #21A, VOL #21B, VOL #22A and VOL #31A form the lowest hierarchy. Further, RAIDG #21 and RAIDG #22 belong to a lower hierarchy to the storage 202, and RAIDG #31 belongs to a lower hierarchy to the storage 302. Furthermore, VOL #21A and VOL #21B belong to a lower hierarchy to RAIDG #21, and VOL #22A belongs to a lower hierarchy to RAIDG #22. Further, VOL #31A belongs to a lower hierarchy to RAIDG #31.

Based on such a hierarchical structure and an affiliation relationship as described above, such a representation that a resource of a lower hierarchy is "included" in a resource of an upper hierarchy is sometimes used (refer to the left figure in FIG. 3). For example, RAIDG #21 is included in the storage 202. Further, VOL #21A is included in RAIDG #21. This similarly applies also to the other resources. In this manner, the management apparatus 100 retains information relating to a relationship between resources.

(Example of Management UI)

Here, an example of a management UI 101a displayed on the display apparatus 101 by the management apparatus 100 is described with reference to FIGS. 4 to 6. The management UI 101a is a display interface that is utilized when a manager who utilizes the management apparatus 100 performs situation confirmation of resources, setting change of resources and so forth. It is to be noted that the display method of the management UI 101a is an example, and the scope of application of the technology according to the second embodiment is not limited to the examples of FIGS. 4 to 6.

It is to be noted that FIG. 4 is a view depicting an example of a management UI (registration storage list) according to the second embodiment. FIG. 5 is a view depicting an example of another management UI (RAID Group list) according to the second embodiment. FIG. 6 is a view depicting an example of a further management UI (Volume list) according to the second embodiment.

The example of FIG. 4 depicts a display screen image of the management UI 101a for displaying a list of storages (registration storages) registered as a management target by the management apparatus 100. For example, the management UI 101a includes item fields in which a title indicating the display substance at present (in the example of FIG. 4, "storage"), a shortcut to information relating to the display substance at present ("detailed information" and "related information") and so forth are displayed. Further, the management UI 101a includes a remark column indicative of a comment relating to the display substance at present, a substance column for displaying the principal substances and so forth.

In a screen image of the management UI 101a that displays a list of registration storages, for example, a name of a storage, an address of the storage, and information indicative of a state of the storage are displayed as the substance column. In the case of the storage management system depicted in FIG. 2, a name, an address and a state ("operative" or "inoperative") of the storages 202 and 302 are displayed in the management UI 101a as depicted in FIG. 4.

For example, if a pointer is operated to point to and select the storage 202, the management UI 101a displays such information of resources in the lower hierarchy to the storage 202 (RAID group list) as depicted in FIG. 5.

The RAID group in the lower hierarchy to the storage 202 includes RAIDG #21 and RAIDG #22. In a screen image of the RAID group list relating to the storage 202, a name of RAIDG #21 and RAIDG #22 and information relating to RAIDG #21 and RAIDG #22 (RAID type, size, state and so forth) are displayed as depicted in FIG. 5. It is to be noted that, in the column for the RAID type, information relating to a RAID level such as mirroring or striping is displayed.

Further, in the column for the state, information indicative of whether or not the RAID group is in an available state is displayed.

For example, if the pointer is operated to point to and select RAIDG #21, the management UI 101a displays such information of resources included in the lower hierarchy to RAIDG #21 as depicted in FIG. 6 (VOL list). It is to be noted that, if the pointer is operated to point to and select the "storage" in the item column, the management UI 101a displays a screen image of the registration storage list depicted in FIG. 4.

VOL in the lower hierarchy to RAIDG #21 includes VOL #21A and VOL #21B. In a screen image of the VOL list relating to RAIDG #21, a name of VOL #21 and VOL #22 and information relating to VOL #21 and VOL #22 (VOL type, size, encryption and state) are displayed as depicted in FIG. 6. It is to be noted that, in the column for VOL type, setting information of, for example, a thin provisioning volume (TPV) or a flexible tier volume (FTV) is displayed. Further, in the encryption column, presence or absence of setting for encrypting data in VOL is displayed.

The above-described display of the management UI 101a is based on the substance of the management table 102. Therefore, if updating of the management table 102 is delayed, there is a risk that the situation of resources is not reflected on the display of the management UI 101a.

(Updating Method of Management Table)

Figure 7:
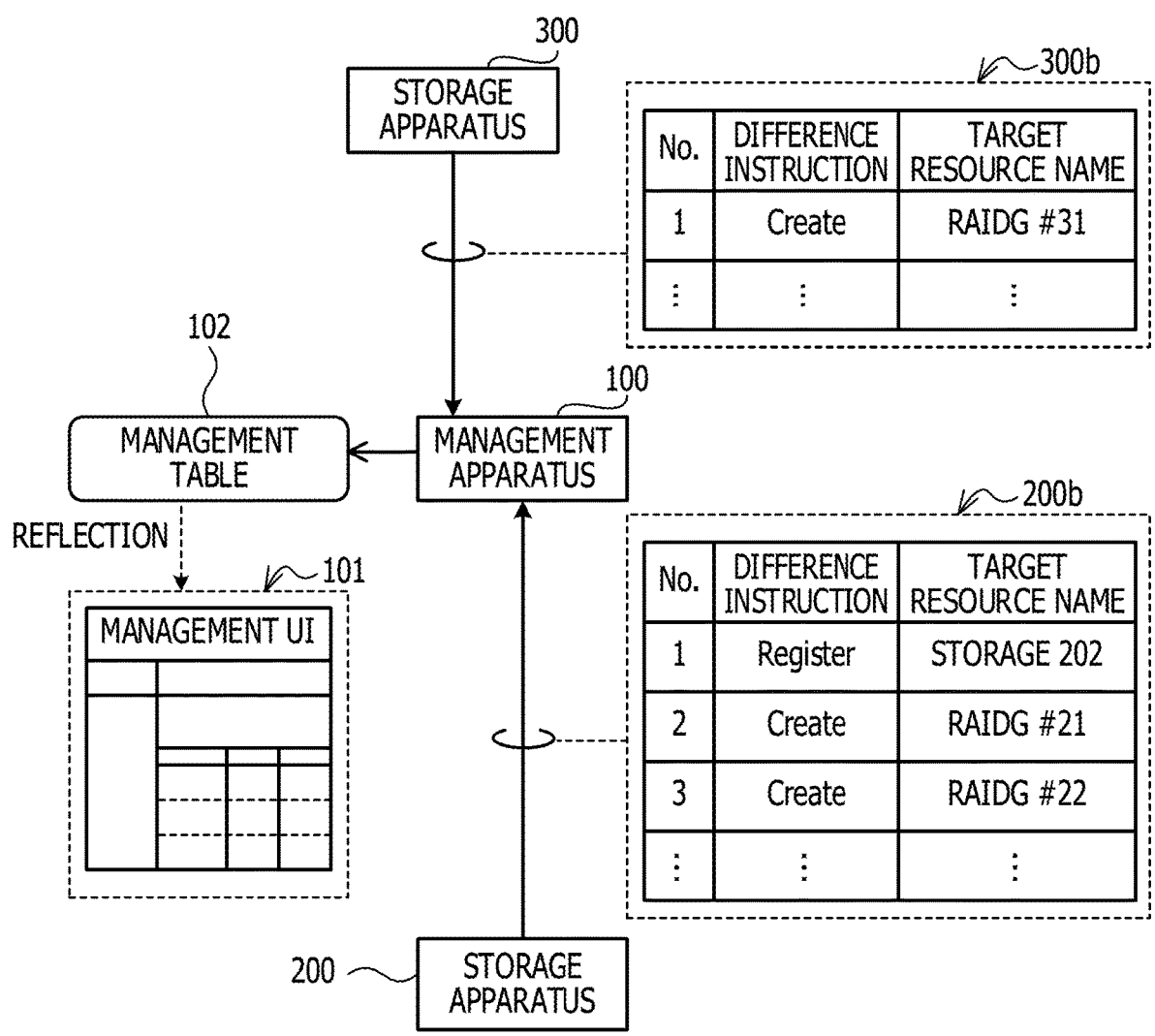
FIG. 7 is a view illustrating an updating method of a management table according to the second embodiment.

Here, an updating method of the management table 102 is described with reference to FIG. 7. FIG. 7 is a view illustrating an updating method of a management table according to the second embodiment.

As depicted in FIG. 7, the management apparatus 100 retains a management table 102 and reflects the substance of the management table 102 on the management UI 101a displayed on the display apparatus 101. If an operation for the storage 202 is performed, the storage apparatus 200 provides the substance of the operation (difference information 200b) to the management apparatus 100. Similarly, if an operation for the storage 302 is performed, the storage apparatus 300 provides the substance of the operation (difference information 300b) to the management apparatus 100.

For example, the storage apparatus 200 (control module 201) retains, after it transmitted the difference information 200b in the preceding operation cycle, information relating to an operation performed for the storage 202 (difference instruction, target resource name) as the difference information 200b. The difference instruction is an execution instruction of an operation for a resource of an operation target (target resource). For example, the difference information 200b includes a difference instruction (Register) for registering the storage 202. Further, the difference information 200b includes a difference instruction (Create) for creating RAIDG #21.

The storage apparatus 200 provides the difference information 200b to the management apparatus 100 when it receives a request from the management apparatus 100 or at given timing. Similarly, the storage apparatus 300 accumulates the difference information 300b and provides the difference information 300b to the management apparatus 100 when it receives a request from the management apparatus 100 or at given timing. However, if the data amount of the difference information 200b or 300b becomes great, the communication load applied upon provision of the difference information 200b or 300b or the processing load when the management table 102 is updated becomes great.

The second embodiment provides a contrivance that reduces such communication load or processing load as described above to reduce the period of time required for updating of the management table 102 and improves the display response of the management UI 101a as hereinafter described.

(Hardware)

Figure 8:
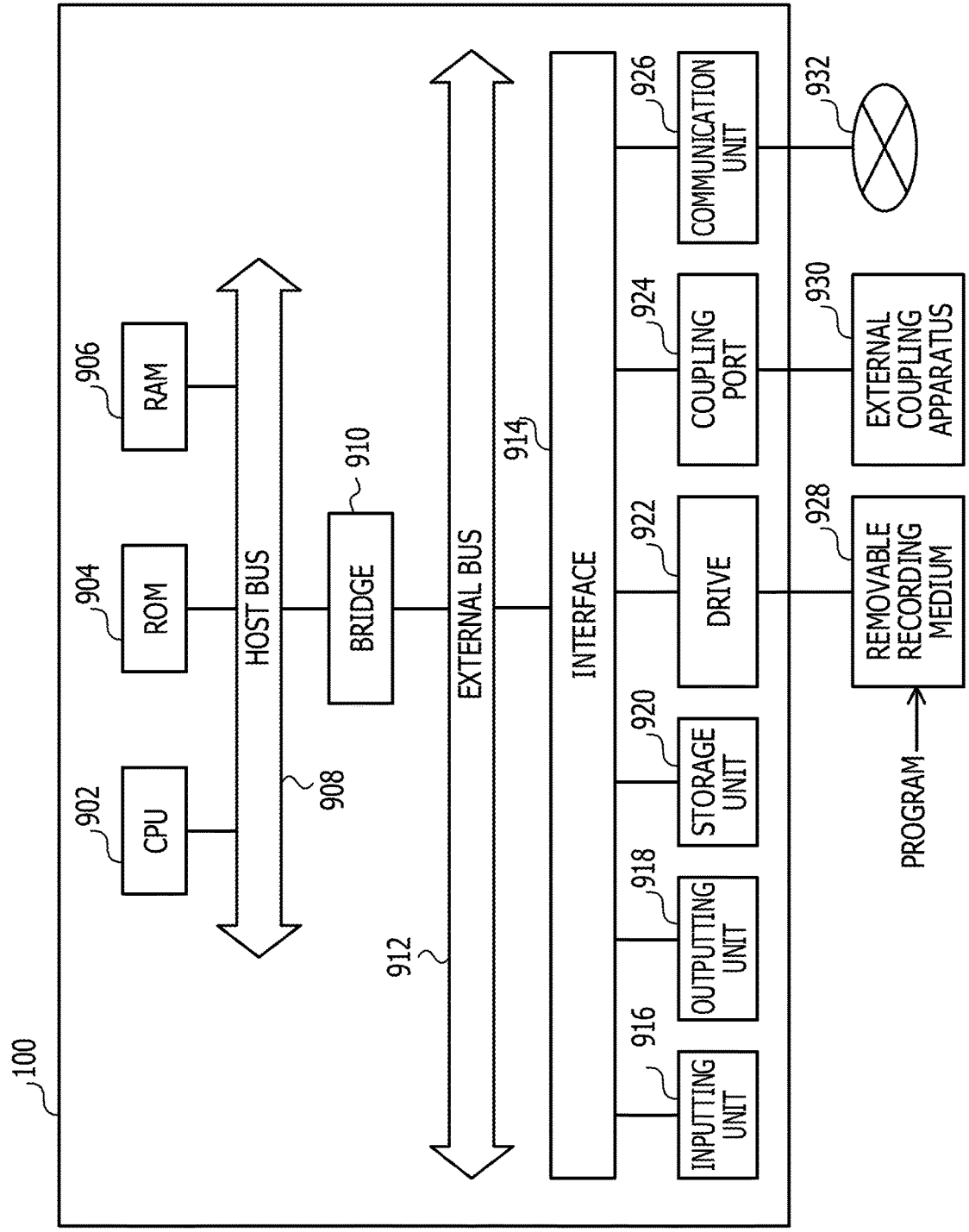
FIG. 8 is a block diagram depicting an example of hardware capable of implementing functions of a management apparatus according to the second embodiment.

Here, hardware of the management apparatus 100 is described with reference to FIG. 8. FIG. 8 is a block diagram depicting an example of hardware capable of implementing functions of a management apparatus according to the second embodiment.

The functions the management apparatus 100 has may be implemented, for example, using hardware resources of an information processing apparatus depicted in FIG. 8. For example, the functions the management apparatus 100 has are implemented by controlling the hardware depicted in FIG. 8 using a computer program.

As depicted in FIG. 8, the hardware principally includes a CPU 902, a read only memory (ROM) 904, a RAM 906, a host bus 908 and a bridge 910. The hardware further includes an external bus 912, an interface 914, an inputting unit 916, an outputting unit 918, a storage unit 920, a drive 922, a coupling port 924 and a communication unit 926.

The CPU 902 functions, for example, as an arithmetic processing device or a control device and controls the entirety or part of operation of the respective components based on various programs stored in the ROM 904, RAM 906, or storage unit 920 or a removable recording medium 928. The ROM 904 is an example of a storage device that stores programs to be read into the CPU 902, data to be used for arithmetic operation and so forth. Into the RAM 906, for example, a program to be read into the CPU 902, various parameters that vary when the program is executed and so forth are temporarily or permanently stored.

These components are coupled to each other, for example, through the host bus 908 that may transmit data at a high speed. Meanwhile, the host bus 908 is coupled to the external bus 912, whose data transmission speed is comparatively low, for example, through the bridge 910. For the inputting unit 916, for example, a mouse, a keyboard, a touch panel, a touch pad, a button, a switch, a lever and so forth are used. Further, as the inputting unit 916, a remote controller that may transmit a control signal utilizing infrared rays or some other radio waves may be used.

For the outputting unit 918, a display apparatus such as a cathode ray tube (CRT), an LCD device, a plasma display panel (PDP), or an ELD device is used. Further, as the outputting unit 918, an audio outputting apparatus such as a speaker or a headphone, a printer or the like may be used. For example, the outputting unit 918 is an apparatus capable of outputting information visually and/or auditorily.

The storage unit 920 is an apparatus for storing various kinds of data. For the storage unit 920, a magnetic storage device such as an HDD is used. Further, as the storage unit 920, a semiconductor storage device such as an SSD or a RAM disk, an optical storage device, or a magneto-optical storage device may be used.

The drive 922 is an apparatus that reads out information recorded on the removable recording medium 928, which is a removable recording medium, or writes information on the removable recording medium 928. For the removable recording medium 928, for example, a magnetic disk, an optical disk, a magneto-optical disk, or a semiconductor memory is used.

The coupling port 924 is a port for coupling an external coupling apparatus 930 such as a universal serial bus (USB)

port, an IEEE (The Institute of Electrical and Electronics Engineers, Inc.) 1394 port, a small computer system interface (SCSI), a recommended standard (RS)-232C port or an optical audio terminal. As the external coupling apparatus 930, for example, a printer is used.

The communication unit 926 is a communication device for coupling to a network 932. For the communication unit 926, for example, a communication circuit for a wired or wireless LAN, a communication circuit for a wireless USB (WUSB), a communication circuit or a router for optical communication, a communication circuit or a router for an asymmetric digital subscriber line (ADSL), or a communication circuit for a portable telephone network is used. The network 932 coupled to the communication unit 926 is a network coupled by a wire or wirelessly and includes, for example, the Internet, a LAN, a broadcasting network, a satellite communication line and so forth.

It is to be noted that, while the example of FIG. 2 is an example in which the display apparatus 101 is coupled to the outside of the management apparatus 100 for the convenience of description, the display apparatus 101 may be built as the outputting unit 918 in the management apparatus 100 as depicted in FIG. 8. Further, the hardware depicted in FIG. 8 is an example, and some element may be omitted from the hardware or some new element may be added to the hardware. Also the functions of the business servers 401 and 402 may be implemented using the hardware depicted in FIG. 8. Therefore, description of hardware of the business servers 401 and 402 is omitted herein.

[2-2. Management Apparatus and Control Module]

Now, functions of the management apparatus 100 and the control modules 201 and 301 are described.

(Functions of Management Apparatus)

Figure 9:
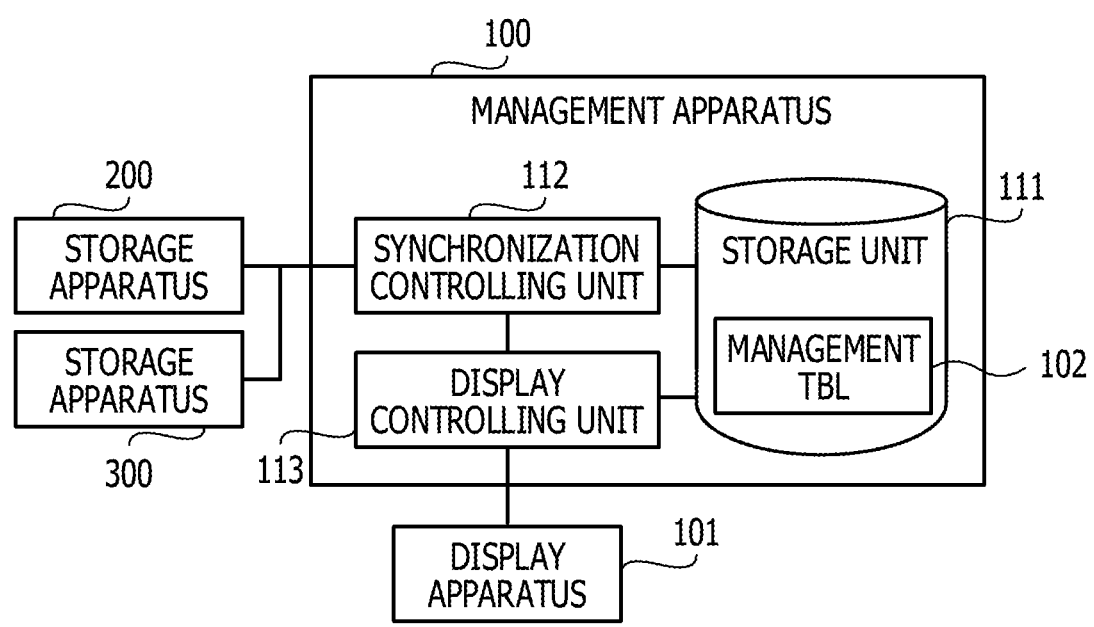
FIG. 9 is a block diagram depicting an example of functions a management apparatus according to the second embodiment has.

First, functions of the management apparatus 100 are described with reference to FIG. 9. FIG. 9 is a block diagram depicting an example of functions a management apparatus according to the second embodiment has.

As depicted in FIG. 9, the management apparatus 100 includes a storage unit 111, a synchronization controlling unit 112 and a display controlling unit 113. It is to be noted that the functions of the storage unit 111 may be implemented using the RAM 906, storage unit 920 or the like described hereinabove. The functions of the synchronization controlling unit 112 and the display controlling unit 113 may be implemented using the CPU 902 and so forth described hereinabove.

In the storage unit 111, the management table 102 (refer to FIG. 3) for managing the resources of the storage apparatus 200 and 300 (storages 202 and 302, RAIDG #21, RAIDG #22, RAIDG #31, VOL #21A, VOL #21B, VOL #22A and VOL #31A) is stored.

The synchronization controlling unit 112 updates the management table 102 based on the difference information 200b and 300b provided from the storage apparatus 200 and 300, respectively. The display controlling unit 113 controls the display apparatus 101 to display the management UI 101a based on the substance of the management table 102. Further, the display controlling unit 113 controls display of the management UI 101a to be displayed on the display apparatus 101 in response to an operation for the management UI 101a performed using the inputting unit 916 (refer FIGS. 4 to 6).

For example, the management table 102 includes information that associates a name of the storages 202 and 302, an address of the storages 202 and 302 and a state of the storages 202 and 302 (operative/inoperative) with each other. The display controlling unit 113 controls the display apparatus 101 to display such a management UI 101a as depicted in FIG. 4 based on the information relating to the storages 202 and 302.

Further, the management table 102 includes information that associates a name of the storages 202 and 302 and a name of a RAID group (RAIDG #21 or the like). Further, the management table 102 includes information that associates a RAID type of a RAID group (RAID0, RAID1, RAID5, RAID10 or the like), a size of the RAID group, and a state of the RAID group (available/unavailable) with each other. The display controlling unit 113 controls the display apparatus 101 to display such a management UI 101a as depicted in FIG. 5 based on the information relating to the RAID group.

Further, the management table 102 includes information that associates a name of a RAID group and a name of a logical volume (VOL #21A or the like) with other. Further, the management table 102 includes information that associates a VOL type of a logical volume (TPV, FTV or the like), a size of the logical volume, presence or absence of encryption for storage data (YES/NO) and a state of the logical volume (available/unavailable). The display controlling unit 113 controls the display apparatus 101 to display such a management UI 101a as depicted in FIG. 6 based on the information relating to the logical volumes.

(Functions of Control Module)

Figure 10:
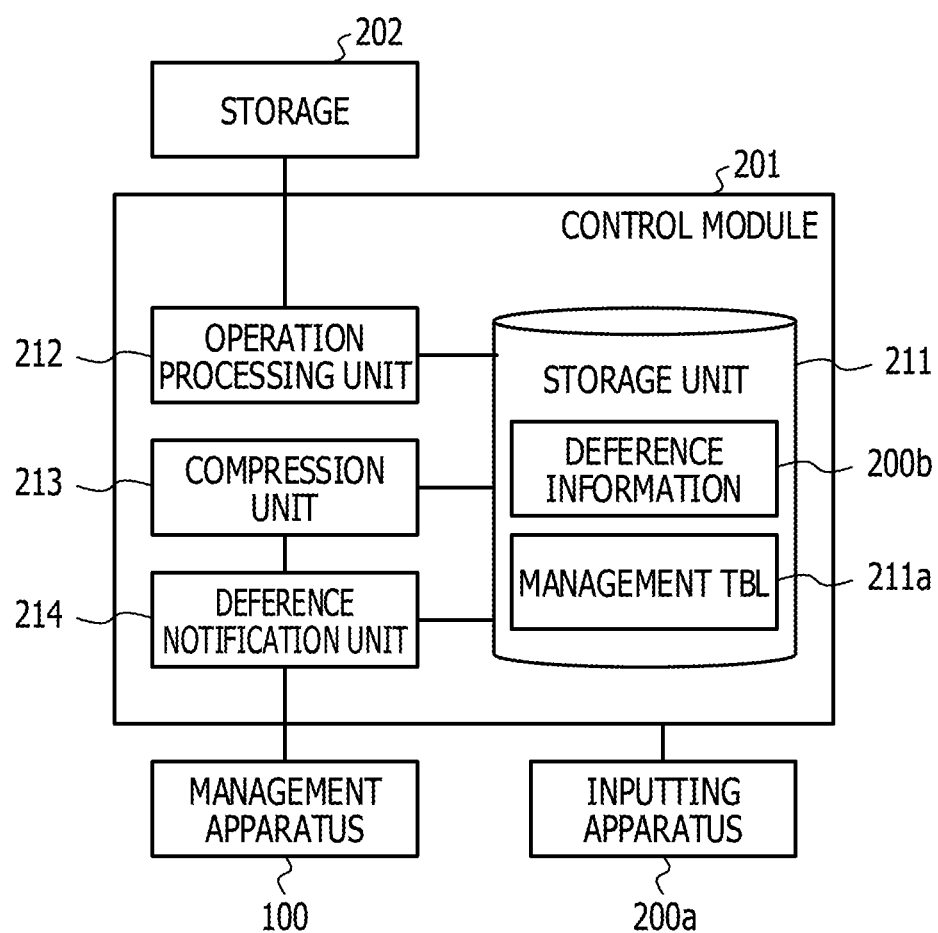
FIG. 10 is a block diagram depicting an example of functions a control module according to the second embodiment has.

Now, functions of the control module 201 are described with reference to FIG. 10. FIG. 10 is a block diagram depicting an example of functions a control module according to the second embodiment has. It is to be noted that, although functions of the control module 201 are described for the convenience of description, also the control module 301 has substantially similar functions. Therefore, detailed description of the functions of the control module 301 is omitted herein.

As depicted in FIG. 10, the control module 201 includes a storage unit 211, an operation processing unit 212, a compression unit 213 and a difference notification unit 214. It is to be noted that functions of the storage unit 211 may be implemented using a hardware resource corresponding to the RAM 906 or the storage unit 920 described hereinabove. Functions of the operation processing unit 212, compression unit 213 and difference notification unit 214 may be implemented using a hardware resource corresponding to the CPU 902 described hereinabove or the like.

In the storage unit 211, difference information 200b (refer to FIG. 7) in which the substance of operations for the storage 202 and the resources (RAIDG #21, RAIDG #22, VOL #21A, VOL #21B and VOL #22A) included in the storage 202 are accumulated is stored. However, the substance of operations included in the difference information 200b is the substance targeting operations performed after the difference information 200b was provided to the management apparatus 100 in the preceding operation cycle.

Further, in the storage unit 211, a management table 211a (table having the substance same as the substance relating to the storage 202 of the management table 102) for use for management of the storage 202 is stored. The management table 211a is updated every time the state of the storage 202 and the resources included in the storage 202 changes in response to an operation.

The operation processing unit 212 executes a process of an operation (operation process) for the storage 202 and the resources included in the storage 202 in response to a request of an operation accepted from the management apparatus 100 or a request of an operation performed through the inputting apparatus 200a.

For example, the operation processing unit 212 executes an operation process for registration (Register) and registration cancellation (Delete) of the storage 202, creation (Create) and deletion (Delete) of a RAID group, creation (Create) and deletion (Delete) of a logical volume and so forth in response to the request described above. As a different operation process, for example, setting of an access path to a logical volume (Set Path) and capacity expansion (Expand), name change and attribute change of each resource and so forth are available.

The compression unit 213 compresses the data amount of the difference information 200b. As described hereinabove, the difference information 200b is utilized for updating of the management table 102. The updating of the management table 102 is carried out for the object of adjusting the management table 102 to the substance representative of the current situation of the storages 202 and 302 and the resources included in the storages 202 and 302. Therefore, even if an operation instruction having no relation to the current situation of the storages 202 and 302 and the resources included in the storages 202 and 302 is not received, the management table 102 is updated appropriately.

Therefore, the compression unit 213 deletes any operation instruction that does not contribute to updating of the management table 102, which is carried out for the object described above, from the difference information 200b thereby to compress the data amount of the difference information 200b. By compressing the difference information 200b, the communication load when the difference information 200b is provided to the management apparatus 100 is reduced. Further, where part of operation instructions is deleted from the difference information 200b, the number of operations to be processed by the management apparatus 100 upon updating of the management table 102 decreases, and this contributes also to reduction of the processing load to the management apparatus 100.

The difference notification unit 214 provides the difference information 200b, whose data amount has been reduced by the compression unit 213, to the management apparatus 100. For example, the difference notification unit 214 provides the difference information 200b to the management apparatus 100 at timing at which such conditions as depicted in FIG. 11 (execution conditions for a synchronization process) are satisfied. FIG. 11 is a view illustrating an execution condition for a synchronization process according to the second embodiment.

The difference information 200b is history information of operation processes accumulated while exchange of information between the storage apparatus 200 and the management apparatus 100 is interrupted. The difference information 200b is accumulated, for example, when the power supply to the management apparatus 100 is off, when the communication path between the management apparatus 100 and the storage apparatus 200 is interrupted or in a like case. There is also a case in which the provision of the difference information 200b is carried out intermittently in order to reduce the communication load or the processing load. In this case, information of the difference process is accumulated into the difference information 200b for a period till a point of time at which the difference information 200b is provided.

For example, when the management apparatus 100 is "operative" and the storage apparatus 200 is "inoperative" while the communication path between the management apparatus 100 and the storage apparatus 200 is "normal," the difference notification unit 214 provides the difference information 200b to the management apparatus 100 upon activation of the storage apparatus 200. At this time, the difference notification unit 214 provides the difference information 200b in a compressed state to the management apparatus 100.

When the management apparatus 100 is "inoperative" and the storage apparatus 200 is "operative" while the communication path between the management apparatus 100 and the storage apparatus 200 is "normal," the difference notification unit 214 provides the difference information 200b to the management apparatus 100 upon activation of the management apparatus 100. For example, the difference notification unit 214 transmits a polling signal for activation confirmation to the operating system (OS) of the storage apparatus 200 after every given interval and provides, when a response is received, the difference information 200b to the management apparatus 100. At this time, the difference notification unit 214 provides the difference information 200b in a compressed state to the management apparatus 100.

When the management apparatus 100 is "operative" and the storage apparatus 200 is "operative" while the communication path between the management apparatus 100 and the storage apparatus 200 is "abnormal," the difference notification unit 214 provides the difference information 200b to the management apparatus 100 upon restoration of the communication path. For example, the difference notification unit 214 executes a communication confirmation command such as Ping after every given interval and provides, when restoration of the communication path is confirmed successfully, the difference information 200b to the management apparatus 100. At this time, the difference notification unit 214 provides the difference information 200b in a compressed state to the management apparatus 100.

When the management apparatus 100 is "operative" and the storage apparatus 200 is "operative" while the communication path between the management apparatus 100 and the storage apparatus 200 is "normal," the difference notification unit 214 provides the difference information 200b in response to a request (synchronization request) from the management apparatus 100. At this time, the difference notification unit 214 provides the difference information 200b in a compressed state to the management apparatus 100. Further, if a command for requesting an operation is inputted from the inputting apparatus 200a, the difference notification unit 214 notifies the management apparatus 100 of the substance of the operation process (corresponding to the difference information 200b in a non-compressed state).

The difference information 200b is provided from the storage apparatus 200 to the management apparatus 100 at such timing as described above, and the management table 102 is updated based on the difference information 200b. This similarly applies also to the difference information 300b of the storage apparatus 300.

(Compression of Difference Information)

Figure 12:
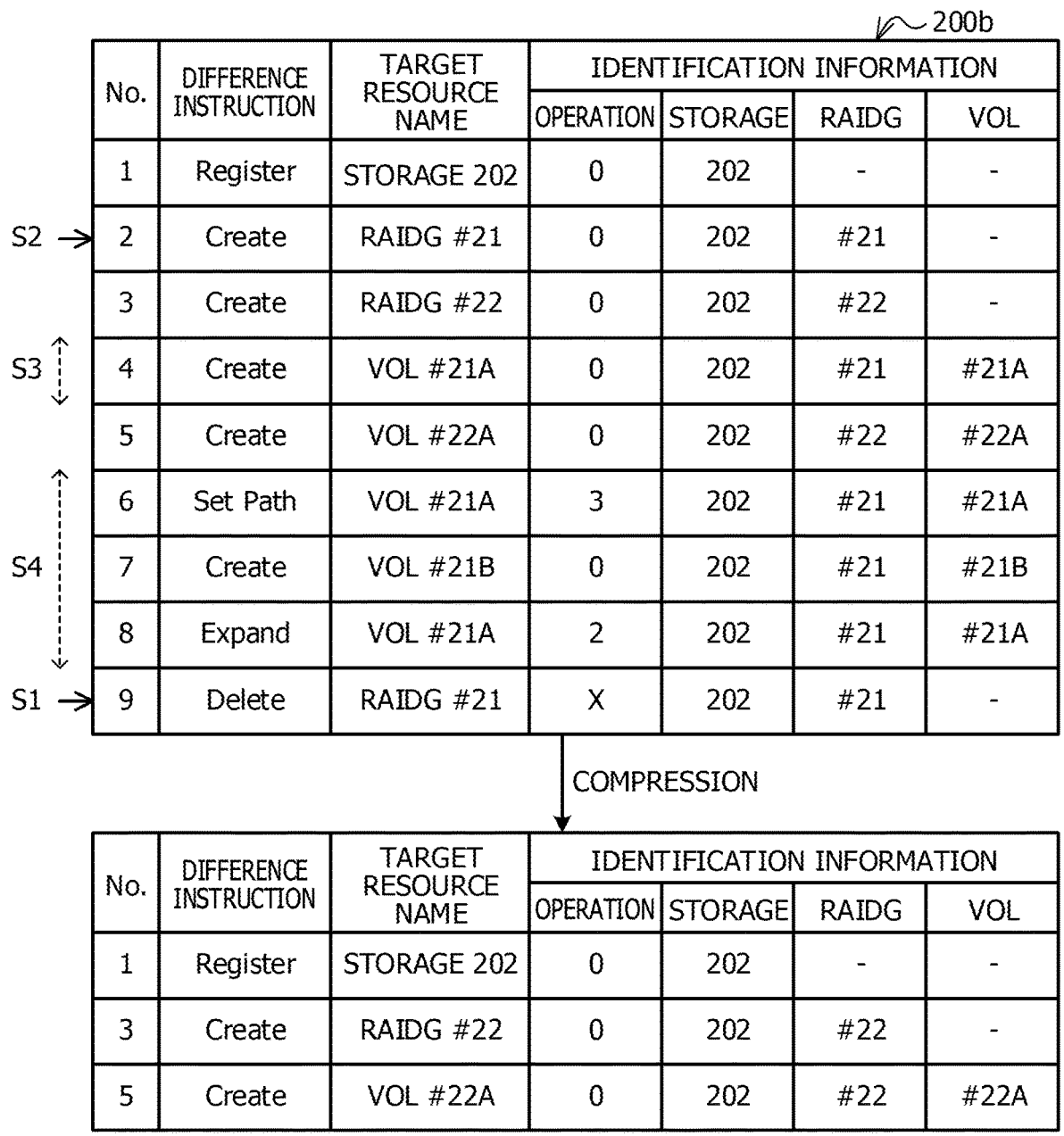
FIG. 12 is a view illustrating a compression method of difference information according to the second embodiment.

Here, a compression method of the difference information 200b by the compression unit 213 is described further with reference to FIG. 12. FIG. 12 is a view illustrating a compression method of difference information according to the second embodiment.

FIG. 12 exemplifies difference information 200b including nine records. As depicted in FIG. 12, the difference information 200b includes, for example, in addition to a difference instruction and a target resource name, identification information for identifying an operation of a target resource, a storage, RAIDG, and VOL.

The identification information of an operation indicates a type of an operation process. In the example of FIG. 12, registration (Register) of a storage, creation (Create) of a RAID group and creation (Create) of a logical volume are allocated to the identification information "0." Meanwhile, the capacity expansion (Expand) of a logical volume is allocated to the identification information "2," and an operation for setting an access path (Set Path) is set to the identification information "3." Further, registration cancellation (Delete) of a storage, deletion (Delete) of a RAID group and deletion (Delete) of a logical volume are allocated to the identification information "X."

In the "storage" column of the identification information, identification information of a storage that is a target resource or of a storage including the target resource is described. In the "RAIDG" column of the identification information, identification information of a RAID group that is a target resource or of a RAID group including the target resource is described. Where the target resource is a storage, "-" is described in the "RAIDG" column. In the "VOL" column of the identification information, identification information of a logical volume that is the target resource is described. Where the target resource is a storage or a RAID group, "-" is described in the "VOL" column.

Where such difference information 200b as described above is available, the compression unit 213 searches for "X" (corresponding to Delete) in the "operation" column of the identification information. In the example of FIG. 12, the ninth (No. 9) record is detected as a record (S1) of the operation "X." In this case, the compression unit 213 refers to the detected records and specifies the target resource of Delete (in this example, RAIDG #21). Then, the compression unit 213 refers, from among records corresponding to different instructions executed prior to the difference instruction of the detected record, to records that target the specified target resource and resources included in the target resource.

In the example of FIG. 12, the second (No. 2), fourth (No. 4) and sixth to eighth (No. 6 to No. 8) records are records of a reference destination. The compression unit 213 decides whether or not the records of the reference destination include a record in which the operation for a target resource is "0." In the example of FIG. 12, the second (No. 2) record is detected as a record (S2) in which the operation for RAIDG #21 that is a target resource is "0." In this case, the compression unit 213 deletes all of the records (S1 to S4) of the reference destination. By this deletion process, as depicted in FIG. 12, the difference information 200b including the nine records is compressed to the difference information 200b including three records.

In the example described above, RAIDG #21 is deleted already, and RAIDG #21 and resources included in RAIDG #21 do not exist at the present point of time. Meanwhile, if the difference information 200b includes Create of RAIDG #21, the management apparatus 100 does not yet receive a notification of the fact that RAIDG #21 has been created, and the presence of RAIDG #21 is not reflected on the management table 102. Therefore, even if the records of RAIDG #21 and resources included in RAIDG #21 are deleted from the difference information 200b, such deletion does not have an influence on updating of the management table 102.

Even if Create of RAIDG #21 does not exist in the difference information 200b, information of RAIDG #21 is included in the management table 102. In this instance, the compression unit 213 leaves the record corresponding to Delete of RAIDG #21 and deletes the other records of RAIDG #21 and resources included in RAIDG #21 similarly as described above. Where a notification of the record corresponding to Delete of RAIDG #21 is issued to the management apparatus 100, the management apparatus 100 may appropriately update the substance of the management table 102 regarding RAIDG #21 and the resources included in RAIDG #21.

It is to be noted that, while description is given above of an example of a case in which a RAID group is deleted, a similar process is performed also when registration of a storage is canceled (Delete) or when a logical volume is deleted. Further, where the operation "X" for a storage, a RAID group or a logical volume is included, the compression unit 213 executes the process described above in order beginning with a resource in an upper hierarchy. By executing a process beginning with a record corresponding to a resource of an upper hierarchy, a process of a record corresponding to a resource of a lower hierarchy that is deleted automatically may be omitted, resulting in decrease of the processing load.

The functions of the management apparatus 100 and the control modules 201 and 301 are such as described above.

[2-3. Flow of Processing]

Now, a flow of processing executed by the management apparatus 100 and the storage apparatus 200 and 300 is described. It is to be noted that, although processes executed principally by the management apparatus 100 and the storage apparatus 200 are described for the convenience of description, also processes targeting the storage apparatus 300 are executed in a similar flow.

(Synchronization Condition: Upon Activation of Storage Apparatus & Upon Inputting of Command)

Figure 13:
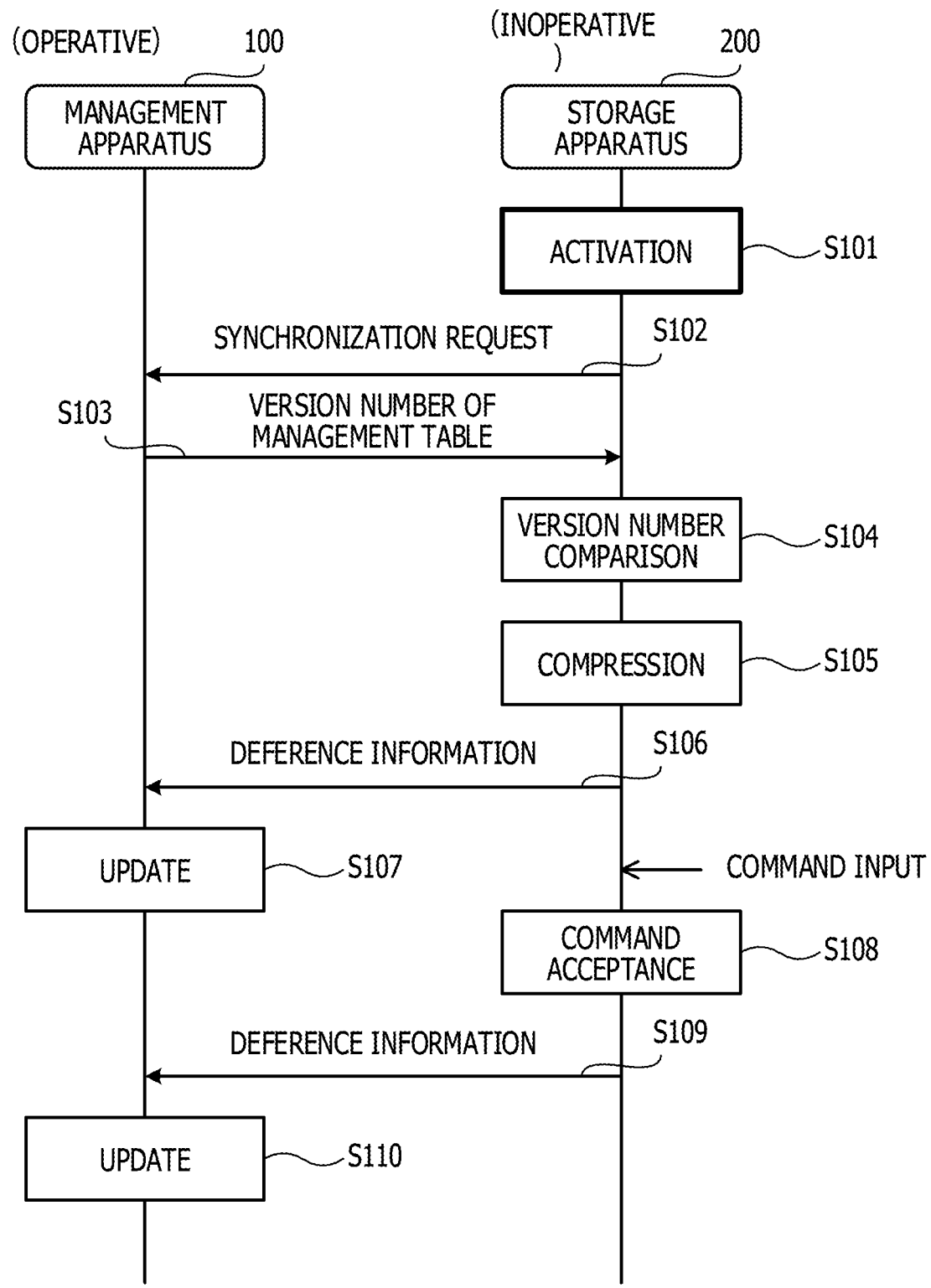
FIG. 13 is a sequence diagram depicting a flow of a synchronization process carried out between a management apparatus and a storage apparatus (upon activation of the storage apparatus and upon inputting of a command) according to the second embodiment.

A flow of a synchronization process (provision of difference information 200b and updating of the management table 102) executing upon activation of the storage apparatus 200 and upon inputting of a command is described with reference to FIG. 13. FIG. 13 is a sequence diagram depicting a flow of a synchronization process carried out between a management apparatus and a storage apparatus (upon activation of the storage apparatus and upon inputting of a command) according to the second embodiment.

It is to be noted that the example of FIG. 13 corresponds to a case in which, from among the execution conditions for a synchronization process depicted in FIG. 11, the management apparatus 100 is "operative" and the storage apparatus 200 is inoperative while the communication path is "normal."

(S101, S102) The storage apparatus 200 is activated in response to turning on of the power supply to the storage apparatus 200. The activated storage apparatus 200 transmits, by the difference notification unit 214, a synchronization request for the notification of start of a synchronization process to the management apparatus 100.

(S103) The management apparatus 100 notifies, by the synchronization controlling unit 112, the storage apparatus 200 of a version number of the management table 102. It is to be noted that the version number of the management table 102 is incremented every time the management table 102 is updated. Further, the version number of the management table 102 is stored into the storage unit 111.

(S104) The storage apparatus 200 compares, by the difference notification unit 214, the version number of the management table 102 notified from the management apparatus 100 and the version number of the management table 211a stored in the storage unit 211 with each other. It is to be noted that the version number of the management table 211a stored in the storage unit 211 is incremented every time the management table 211a is updated. If the two version numbers compared with each other indicate coincidence, the storage apparatus 200 ends the synchronization process. On the other hand, if the version numbers compared with each other do not indicate coincidence, the storage apparatus 200 advances its processing to S105.

(S105, S106) The storage apparatus 200 compresses, by the compression unit 213, the difference information 200b by the method described hereinabove with reference to FIG. 12. Then, the storage apparatus 200 transmits, by the difference notification unit 214, the difference information 200b after the compression to the management apparatus 100.

(S107) The management apparatus 100 updates, by the synchronization controlling unit 112, the management table 102 based on the difference information 200b received from the storage apparatus 200. Further, the management apparatus 100 increments, by the synchronization controlling unit 112, the version number of the management table 102 and stores the latest version number into the storage unit 111.

It is to be noted that the state after the process at S107 is completed corresponds to a state in the case where, from among the execution conditions for synchronization process depicted in FIG. 11, the management apparatus 100 is "operative" and the storage apparatus 200 is "operative" while the communication path is "normal." If, in this state, a command (execution request for a difference instruction) is inputted from the inputting apparatus 200a, the processing advances to S108.

(S108) The storage apparatus 200 accepts, by the operation processing unit 212, the command inputted from the inputting apparatus 200a. Then, the storage apparatus 200 executes, by the operation processing unit 212, an operation process in accordance with the accepted command. Further, the storage apparatus 200 updates, by the operation processing unit 212, the management table 211a in response to a result of the operation process and increments the version number of the management table 211a.

(S109) The storage apparatus 200 transmits, by the difference notification unit 214, information of the operation process executed at S108 (corresponding to the difference information 200b in the non-compressed state) to the management apparatus 100. At this time, the storage apparatus 200 transmits the information of the operation process without compressing the same. In the case of an operation process by a command input, the information of the operation process to be accumulated in the storage unit 211 as the difference information 200b is small in amount. Therefore, even if the compression process is omitted, the influence of this upon the communication load is not great.

(S110) The management apparatus 100 updates, by the synchronization controlling unit 112, the management table 102 based on the information of the operation process received from the storage apparatus 200. Further, the management apparatus 100 increments, by the synchronization controlling unit 112, the version number of the management table 102 and stores the latest version number into the storage unit 111.

When the process at S110 is completed, the series of processes depicted in FIG. 13 ends. It is to be noted that, if a further command input exists, the processes at the steps beginning with S108 are executed.

(Synchronization Condition: Upon Activation of Management Apparatus)

Now, a flow of a synchronization process (provision of the difference information 200b and updating of the management table 102) executed upon activation of the management apparatus 100 is described with reference to FIG. 14.

Figure 14:
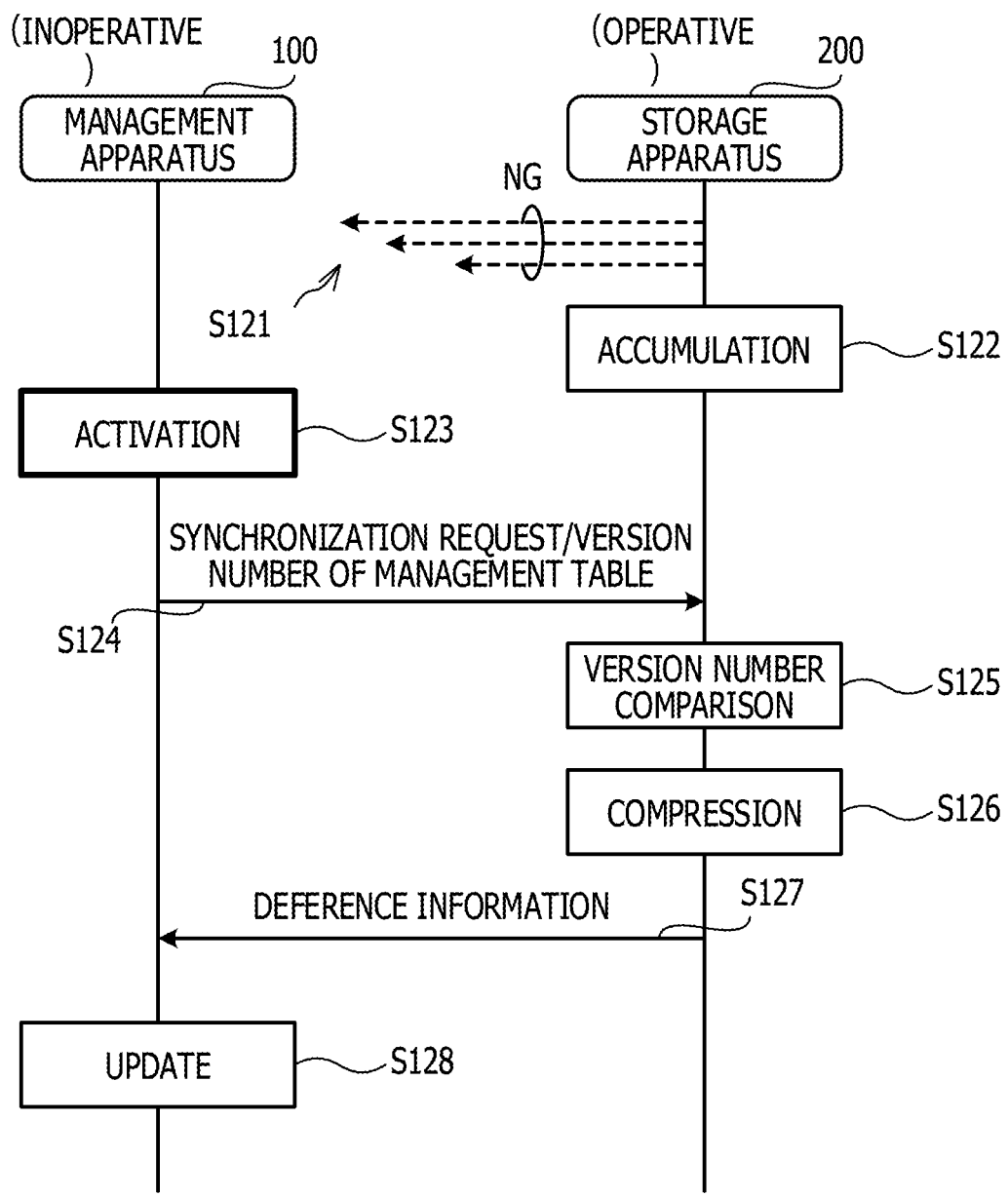
FIG. 14 is a sequence diagram depicting a flow of another synchronization process carried out between a management apparatus and a storage apparatus (upon activation of the management apparatus) according to the second embodiment.

FIG. 14 is a sequence diagram depicting a flow of another synchronization process carried out between a management apparatus and a storage apparatus (upon activation of the management apparatus) according to the second embodiment.

It is to be noted that the example of FIG. 14 corresponds to the case in which, from among the execution conditions of the synchronization process depicted in FIG. 11, the management apparatus 100 is "inoperative" and the storage apparatus 200 is "operative" while the communication path is "normal."

(S121, S122) The storage apparatus 200 transmits a polling signal for activation confirmation to the OS of the storage apparatus 200 after every given interval by the difference notification unit 214. It is to be noted that a synchronization request may be transmitted in place of the polling signal. Since the management apparatus 100 is "inoperative", the storage apparatus 200 fails to obtain a response to the polling signal. In such a situation as just described, the storage apparatus 200 accumulates, by the operation processing unit 212, a history of an operation process for the storage 202 and resources included in the storage 202 as difference information 200b into the storage unit 211.

(S123, S124) The management apparatus 100 is activated. The management apparatus 100 whose activation is completed issues, by the synchronization controlling unit 112, a request for a synchronization process to the storage apparatus 200 and notifies the storage apparatus 200 of the version number of the management table 102. It is to be noted that, though not depicted, the management apparatus 100 issues, by the synchronization controlling unit 112, a request for a synchronization process also to the storage apparatus 300 and transmits the version number of the management table 102 to the storage apparatus 300.

(S125) The storage apparatus 200 compares, by the difference notification unit 214, the version number of the management table 102 received from the management apparatus 100 and the version number of the management table 211a stored in the storage unit 211 with each other. If the two version numbers compared with each other indicate coincidence, the storage apparatus 200 ends the synchronization process. On the other hand, if the two version numbers compared with each other do not indicate coincidence, the storage apparatus 200 advances the processing to S126.

(S126, S127) The storage apparatus 200 compresses, by the compression unit 213, the difference information 200b in accordance with the method described hereinabove with reference to FIG. 12. Then, the storage apparatus 200 transmits, by the difference notification unit 214, the difference information 200b after the compression to the management apparatus 100.

(S128) The management apparatus 100 updates, by the synchronization controlling unit 112, the management table 102 based on the difference information 200b received from the storage apparatus 200. Further the management apparatus 100 increments, by the synchronization controlling unit 112, the version number of the management table 102 and stores the latest version number into the storage unit 111. When the process at S128 is completed, the sequence of processes depicted in FIG. 14 ends.

(Synchronization Condition: Upon Restoration of Communication Path)

Figure 15:
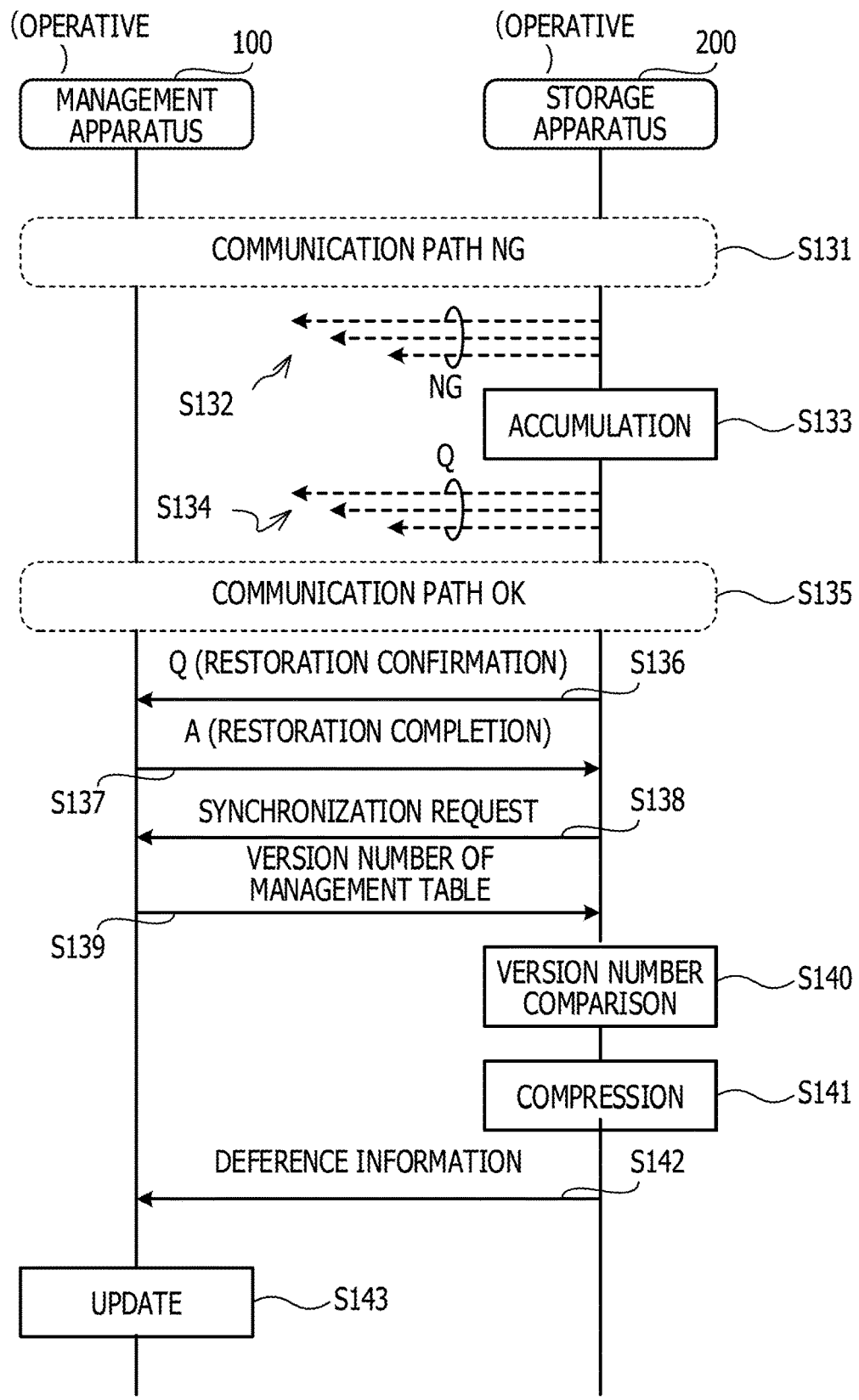
FIG. 15 is a sequence diagram depicting a flow of a further synchronization process carried out between a management apparatus and a storage apparatus (upon restoration of a communication path) according to the second embodiment.

Now, a flow of a synchronization process (provision of the difference information 200b and updating of the management table 102) executed upon restoration of the communication path is described with reference to FIG. 15. FIG. 15 is a sequence diagram depicting a flow of a further synchronization process carried out between a management apparatus and a storage apparatus (upon restoration of a communication path) according to the second embodiment.

It is to be noted that the example of FIG. 15 corresponds to the case in which, from among the execution conditions of the synchronization process depicted in FIG. 11, the management apparatus 100 is "operative" and the storage apparatus 200 is "operative" while the communication path is "abnormal."

(S131, S132, S133) An abnormal state (NG) occurs in the communication path between the management apparatus 100 and the storage apparatus 200. In this case, a response to a polling signal or a synchronization request transmitted form the storage apparatus 200 is not obtained from the management apparatus 100. In such a situation as just described, the storage apparatus 200 accumulates, by the operation processing unit 212, a history of an operation process for the storage 202 and resources included in the storage 202 as difference information 200b into the storage unit 211.

(S134) The storage apparatus 200 issues, by the difference notification unit 214, a command Q for communication confirmation such as Ping after every given interval. It is to be noted that the storage apparatus 200 may be modified such that it transmits a polling signal or a synchronization request in place of the command Q.

(S135, S136, S137) If the communication path restores its normal state (OK), the storage apparatus 200 recognizes, by the difference notification unit 214, the restoration of the communication path based on outputting of a command Q. It is to be noted that, in the example of FIG. 15, the storage apparatus 200 transmits, by the difference notification unit 214, a polling signal for restoration configuration to the OS of the management apparatus 100 and confirms restoration of the communication path from a response from the management apparatus 100.

(S138, S139) The storage apparatus 200 confirming the restoration of the communication path transmits, by the difference notification unit 214, a synchronization request for the notification of start of a synchronization process to the management apparatus 100. The management apparatus 100 receiving the synchronization request notifies, by the synchronization controlling unit 112, the storage apparatus 200 of the version number of the management table 102.

(S140) The storage apparatus 200 compares, by the difference notification unit 214, the version number of the management table 102 notified from the management apparatus 100 and the version number of the management table 211a stored in the storage unit 211 with each other. If the two version numbers compared with each other indicate coincidence, the storage apparatus 200 ends the synchronization process. On the other hand, if the two version numbers compared with each other do not indicate coincidence, the storage apparatus 200 advances the processing to S141.

(S141, S142) The storage apparatus 200 compresses, by the compression unit 213, the difference information 200b in accordance with the method described hereinabove with reference to FIG. 12. Then, the storage apparatus 200 transmits, by the difference notification unit 214, the difference information 200b after the compression to the management apparatus 100.

(S143) The management apparatus 100 updates, by the synchronization controlling unit 112, the management table 102 based on the difference information 200b received from the storage apparatus 200. Further, the management apparatus 100 increments, by the synchronization controlling unit 112, the version number of the management table 102 and stores the latest version number into the storage unit 111. When the process at S143 is completed, the series of processes depicted in FIG. 15 ends.

(Operation of Control Module: Accumulation—Compression—Transmission)

Figure 16:
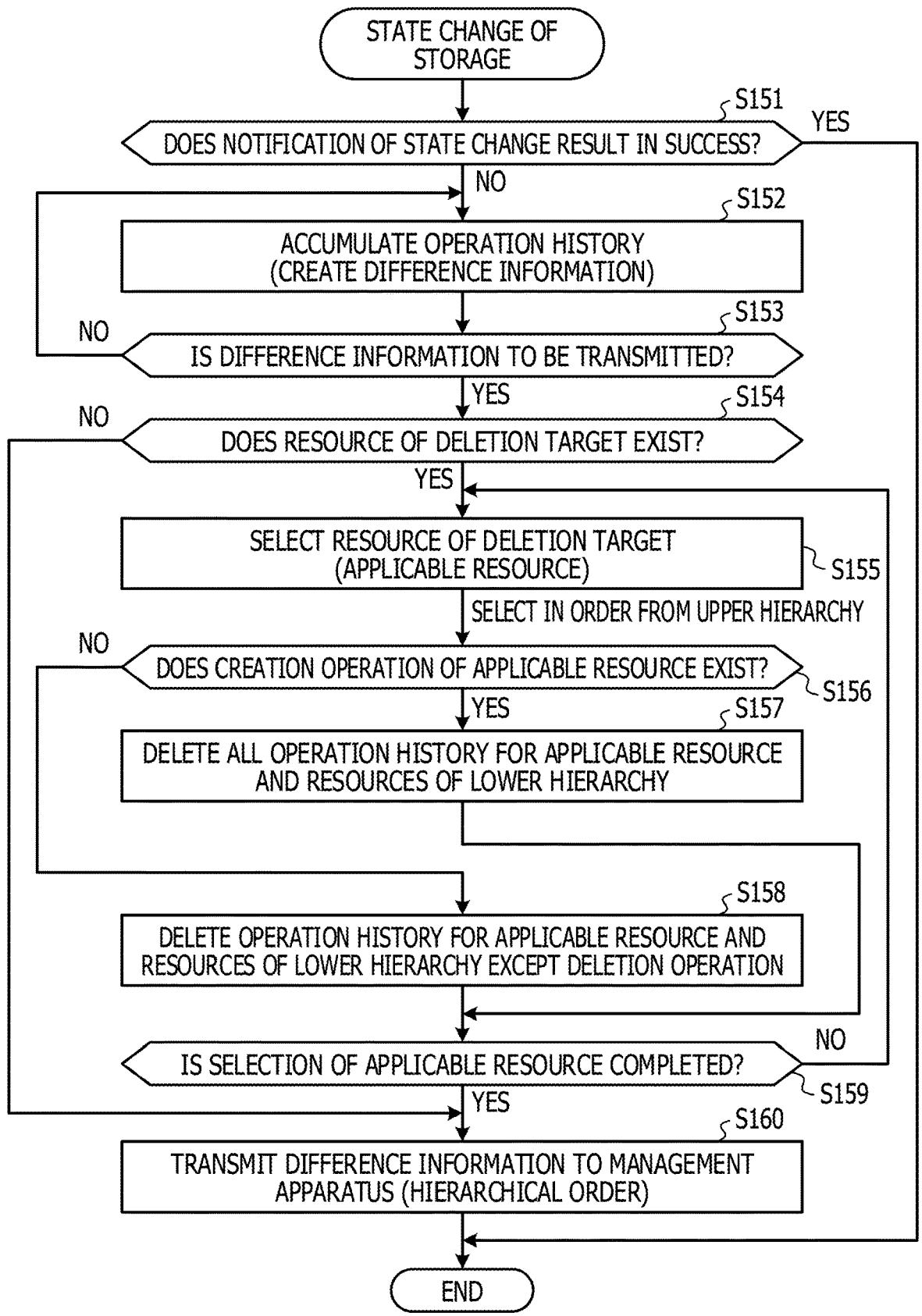
FIG. 16 is a flow chart illustrating operation (generation, compression and transmission of difference information) of a storage apparatus according to the second embodiment.

Now, operation of the storage apparatus 200 is described further with reference to FIG. 16. FIG. 16 is a flow chart illustrating operation (generation, compression and transmission of difference information) of a storage apparatus according to the second embodiment. It is to be noted that the operation of the storage apparatus 200 exemplified in FIG. 16 is operation when an operation process for the storage 202 or a resource included in the storage 202 is executed and a state change occurs with the resources.

(S151) If an operation process for the storage 202 or a resource included in the storage 202 is executed by the operation processing unit 212, the difference notification unit 214 transmits a notification of a state change including the substance of the operation process to the management apparatus 100. Then, the difference notification unit 214 decides whether or not the notification of a state change is received normally by the management apparatus 100 (whether or not the notification of the state change results in success).

If the notification of the state change results in success, the series of processes depicted in FIG. 16 ends. On the other hand, if the notification of the state change results in failure, the processing advances to S152. For example, when the power supply to the management apparatus 100 is OFF or when the communication path suffers from some abnormal situation, the notification of the state change results in failure.

(S152) The operation processing unit 212 accumulates a history of an operation process (operation history) into the storage unit 211. For example, the operation processing unit 212 creates difference information 200b.

(S153) The difference notification unit 214 decides whether or not the difference information 200b is to be transmitted to the management apparatus 100. For example, if the execution conditions for a synchronization process depicted in FIG. 11 are satisfied, the difference notification unit 214 decides that the difference information 200b is to be transmitted to the management apparatus 100. If the difference notification unit 214 decides that the difference information 200b is to be transmitted to the management apparatus 100, the processing advances to S154. On the other hand, if it is decided that the difference information 200b is not to be transmitted to the management apparatus 100, the processing advances to S152.

(S154) The compression unit 213 decides whether or not a resource of a deletion target (in the example of FIG. 12, a resource corresponding to the operation "X") exists. If a resource or resources of a deletion target exist, the processing advances to S155. On the other hand, if a resource of a deletion target does not exist, the processing advances to S160.

(S155) The compression unit 213 selects one of the resources of the deletion target (applicable resource). Where a plurality of applicable resources is available, the compression unit 213 preferentially selects a resource of an upper hierarchy. It is to be noted that, where a plurality of applicable resources belongs to the same hierarchy, the compression unit 213 selects one of the applicable resources that is not selected in accordance with a given order (for example, in a time series order) or at random.

(S156) The compression unit 213 refers to the difference information 200b to decide whether or not a creation operation (Create) of the applicable resource exists. If a creation operation of the applicable resource exists, the processing advances to S157. On the other hand, if a creation operation of the applicable resource does not exist, the processing advances to S158.

(S157) The compression unit 213 deletes all of the operation history of the applicable resource and resources included in the applicable resource (resources in the lower hierarchy or hierarchies) from the difference information 200b. After the process at S157 is completed, the processing advances to S159.

(S158) The compression unit 213 deletes all operation histories for the applicable resource and the resources included in the applicable resource (resources in the lower hierarchy or hierarchies) except the deletion operation of the applicable resource from the difference information 200b. For example, from among the operation histories of the applicable resource and the resources included in the applicable resource (resources of the lower hierarchy or hierarchies), only the deletion operation of the applicable resource is left in the difference information 200b.

(S159) The compression unit 213 decides whether or not selection of an applicable resource is completed. If selection of an applicable resource is completed, the processing advances to S160. On the other hand, if there remains an applicable resource that is not selected as yet, the processing advances to step S155.

(S160) The difference notification unit 214 transmits the difference information 200b to the management apparatus 100. At this time, the difference notification unit 214 specifies, from within the difference information 200b, the information regarding a resource of an upper hierarchy and information regarding a resource or resources of a lower hierarchy or hierarchies. Then, the difference notification unit 214 transmits, from within the difference information 200b, the information regarding the resource of the upper hierarchy first and then transmits the information regarding the resources of the lower hierarchy or hierarchies. For example, the difference notification unit 214 first transmits information of an operation process whose target resource is the storage 202 and then transmits information of an operation process whose target resource is a RAID group, and finally transmits information of an operation process whose target resource is a logical volume. When the process at step S160 is completed, the series of processes depicted in FIG. 16 ends.

The flows of processing executed by the management apparatus 100 and the storage apparatus 200 and 300 are such as described above.

[2-4. Modification]

Here, a modification to the second embodiment is described.

(Name Change and Size Change)

Figure 17:
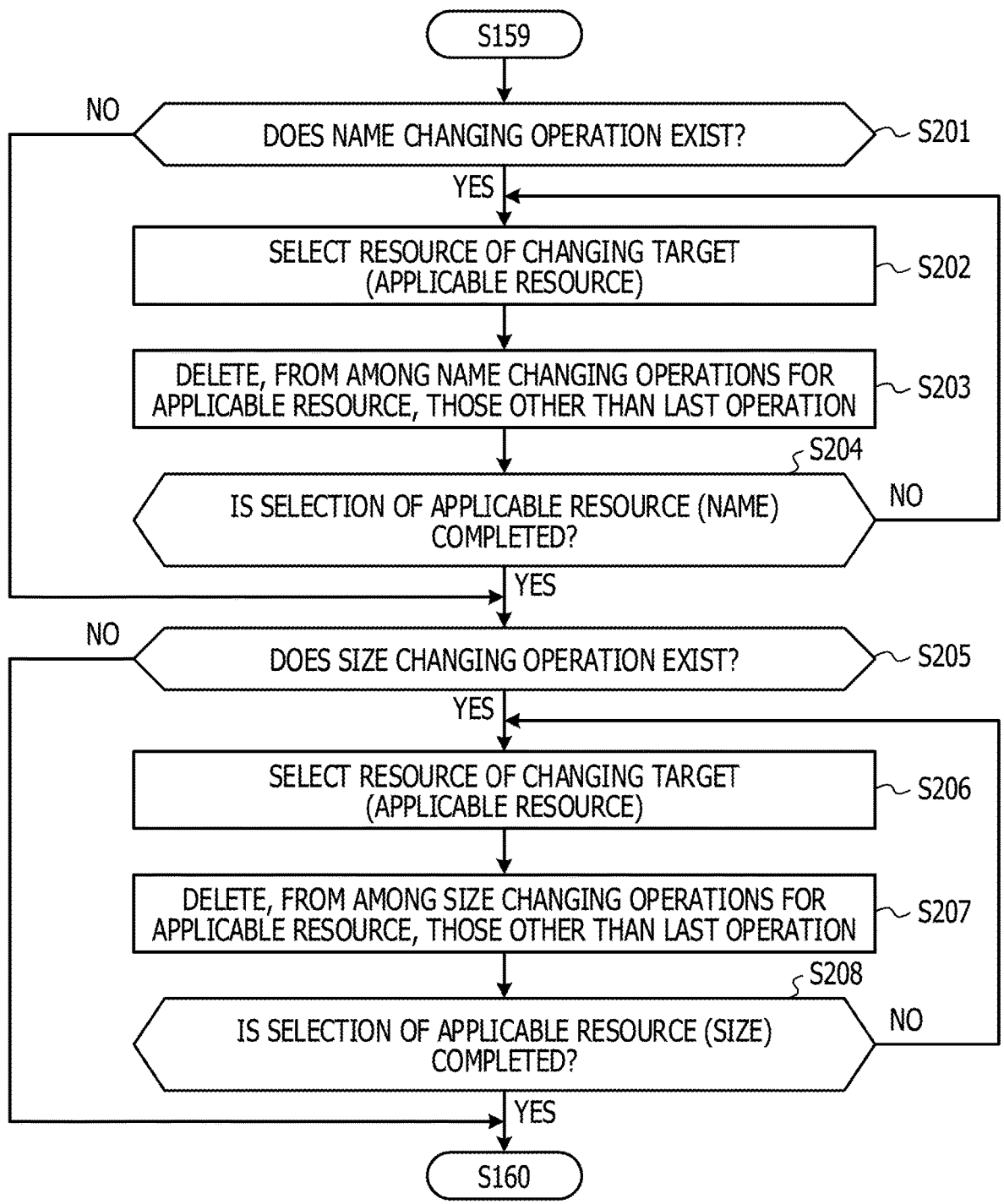
FIG. 17 is a flow chart illustrating operation (generation, compression and transmission of difference information) of a storage apparatus according to a modification to the second embodiment.

In the foregoing description, regarding compression of the difference information 200b, description is given principally of a method for specifying a record that may be deleted from within the difference information 200b from a start point provided by a deletion operation (delete) of a resource. Here, a modification wherein a record that may be deleted from a start point provided by an operation other than a deletion operation (name change and size change) is specified is described with reference to FIG. 17. FIG. 17 is a flow chart illustrating operation (generation, compression and transmission of difference information) of a storage apparatus according to a modification to the second embodiment.

It is to be noted that, where the present modification is applied, the series of processes depicted in FIG. 17 is inserted between the process at S159 and the process at S160 in the processing flow depicted in FIG. 16. In the following, the inserted processes are described.

(S201) The compression unit 213 refers to the difference information 200b to decide whether or not a name changing operation exists. If a name changing operation exists, the processing advances to S202. On the other hand, if a name changing operation does not exist, the processing advances to S205.

(S202) The compression unit 213 selects one of resources of a changing target (applicable resource).

(S203) The compression unit 213 extracts all name changing operations for the applicable resource from within the difference information 200b. Then, the compression unit 213 specifies, from among the extracted name changing operations, a name changing operation carried out last in time (last operation), and deletes all of the name changing operations for the applicable resource other than the last operation from the difference information 200b. It is to be noted that, if information of the name set last is available, since the resource name at present is known, the management table 102 may be updated appropriately only with the information of the last operation.

(S204) The compression unit 213 decides whether or not selection of the applicable resource regarding the name changing operation is completed. If selection of the applicable resource is completed, the processing advances to S205. On the other hand, if an applicable resource that is not selected as yet remains, the processing advances to S202.

(S205) The compression unit 213 refers to the difference information 200b to decide whether or not a size changing operation exists. If a size changing operation or operations exist, the processing advances step S206. On the other hand, if a size changing operation does not exist, the series or processes depicted in FIG. 17 is ended.

(S206) The compression unit 213 selects one of resources of a changing target (applicable resource).

(S207) The compression unit 213 extracts, from within the difference information 200b, all size changing operations for the applicable resource. Then, the compression unit 213 specifies, from among the extracted size changing operations, a size changing operation (last operation) carried out last in time and deletes all of the size changing operations for the applicable resource other than the last operation from the difference information 200b. It is to be noted that, if information of a size set last is available, since the size at present is known, the management table 102 may be updated appropriately only with the information of the last operation.

(S208) The compression unit 213 decides whether or not selection of the applicable resource regarding the size changing operation is completed. If selection of the applicable resource is completed, the series of processes depicted in FIG. 17 ends. On the other hand, if there remains an applicable resource that is not selected as yet, the processing advances to S206.

As described above, as regards an operation according to which the resource state at present is determined if the last one of the operations is known such as a name changing operation or a size changing operation, even if records of like operations in the past are deleted while the record of the last operation is left, the management table 102 may be updated appropriately from the difference information 200b. For an operation of the type just described, the technology of the modification may be applied as it is.

(Priority Degree: Hierarchies)

Figure 18:
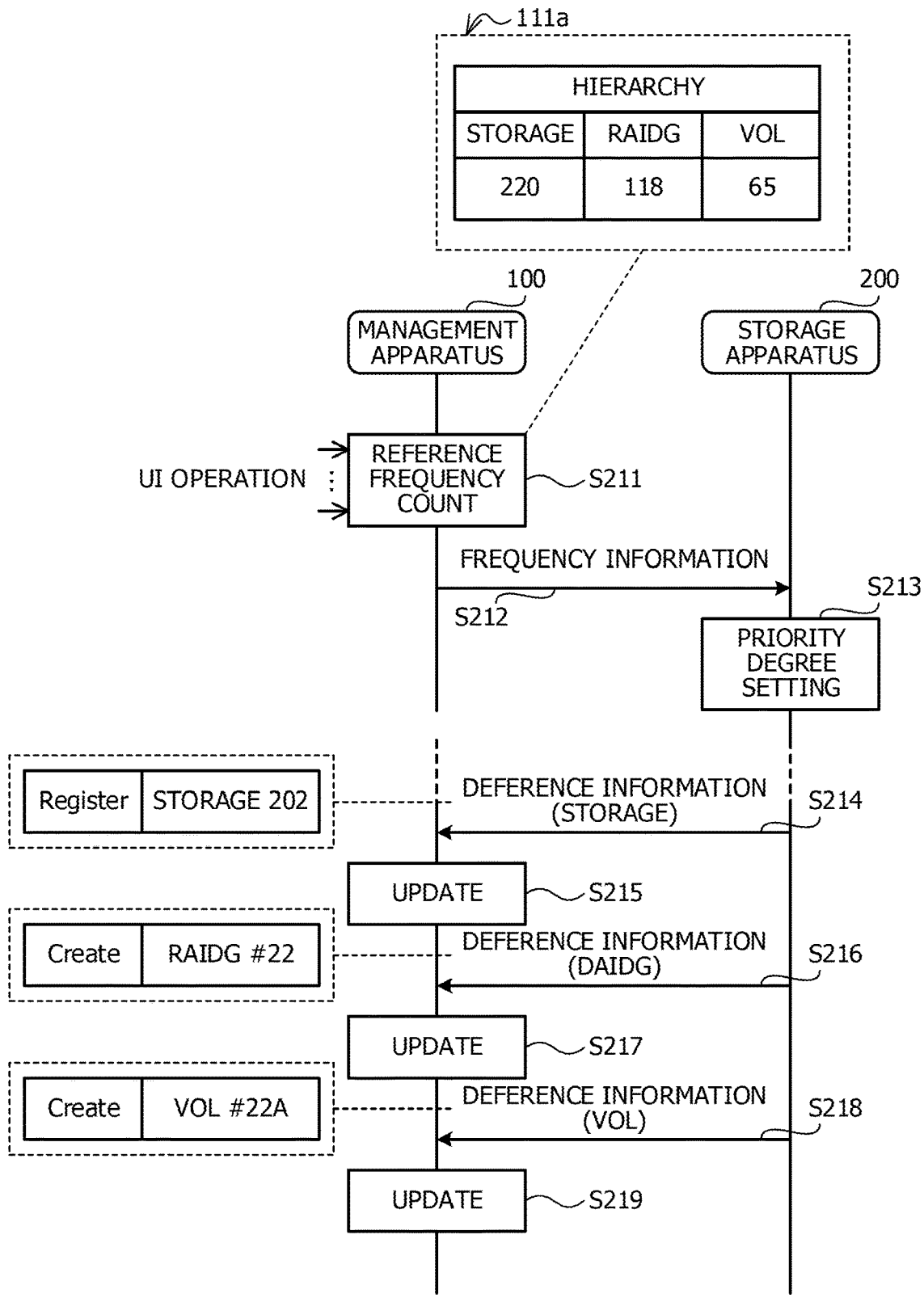
FIG. 18 is a sequence diagram depicting a flow of a synchronization process according to a modification to the second embodiment (example in which priority degree among hierarchies is taken into consideration)

Now, a method of taking the priority degree among hierarchies into consideration when the difference information 200*b* is to be transmitted is described with reference to FIG. 18. FIG. 18 is a sequence diagram depicting a flow of a synchronization process according to a modification to the second embodiment (example in which priority degree among hierarchies is taken into consideration).

A method of transmitting, when the difference information 200*b* is to be transmitted, the information in order beginning with a record corresponding to a resource of an upper hierarchy (refer to S160 of FIG. 16). Here, a method of transmitting information of the difference information 200*b* in order beginning with a resource of a hierarchy, which is referred to in a higher frequency from the management UI 101*a*, to the management apparatus 100 is described.

(S211) The management apparatus 100 counts, by the display controlling unit 113, the reference frequency of the management UI 101*a* and accumulates the information as frequency information 111*a* into the storage unit 111.

For example, when a registration storage list screen image of the management UI 101*a* (for example, refer to FIG. 4) is displayed, the display controlling unit 113 of the management apparatus 100 increments the count of the reference frequency to the hierarchy of the storage. Further, when a RAID group list screen image of the management UI 101*a* (refer to FIG. 5) is displayed, the display controlling unit 113 of the management apparatus 100 increments the count of the reference frequency to the hierarchy of the RAID group. Further, when a logical volume list screen image (refer to FIG. 6) of the management UI 101*a* is displayed, the display controlling unit 113 of the management apparatus 100 increments the count of the reference frequency to the hierarchy of the logical volume.

(S212) The management apparatus 100 transmits, by the synchronization controlling unit 112, the frequency information 111*a* to the storage apparatus 200. The frequency information 111*a* may be transmitted at given timing (or example, after each one hour) or may be transmitted together with a version number of the management table 102 in response to a synchronization request from the storage apparatus 200.

(S213) The storage apparatus 200 sets, by the difference notification unit 214, a priority degree based on the frequency information 111*a*. For example, in the case of the frequency information 111*a* exemplified in FIG. 18, the reference frequency of the storage is 220; the reference frequency of the RAID group is 118; and the reference frequency of the logical volume is 65. In this case, the difference notification unit 214 of the storage apparatus 200 sets the priority degree for the hierarchy of the storage to the first rank; sets the priority degree for the hierarchy of the RAID group to the second rank; and sets the priority degree for the hierarchy of the logical volume to the third rank.

(S214, S215) When the execution conditions for a synchronization process are satisfied and the difference information 200*b* is to be transmitted, the difference notification unit 214 extracts, based on the priority degrees set at S213, information whose priority degree is the first rank (in the present example, information of the storage hierarchy) from the difference information 200*b*, and transmits the extracted information. The management apparatus 100 updates, by the synchronization controlling unit 112, the management table 102 based on information received from the storage apparatus 200.

(S216, S217) The difference notification unit 214 extracts, based on the priority degrees set at S213, information whose priority degree is the second rank (in the present example, information of the RAID group hierarchy) from the difference information 200*b*, and transmits the extracted information. The management apparatus 100 updates, by the synchronization controlling unit 112, the management table 102 based on information received from the storage apparatus 200.

(S218, S219) The difference notification unit 214 extracts, based on the priority degrees set at S213, information whose priority degree is the third rank (in the present example, information of the logical volume hierarchy) from the difference information 200*b*, and transmits the extracted information. The management apparatus 100 updates, by the synchronization controlling unit 112, the management table 102 based on information received from the storage apparatus 200.

When the process at step S219 is completed, the series of processes depicted in FIG. 18 ends. By preferentially transmitting information having a high reference frequency such that the management table 102 is successively updated based on the information in such a manner as describe above, the updating response of display information having a high reference frequency is improved.

(Priority Degree: Storage Apparatus)

Figure 19:
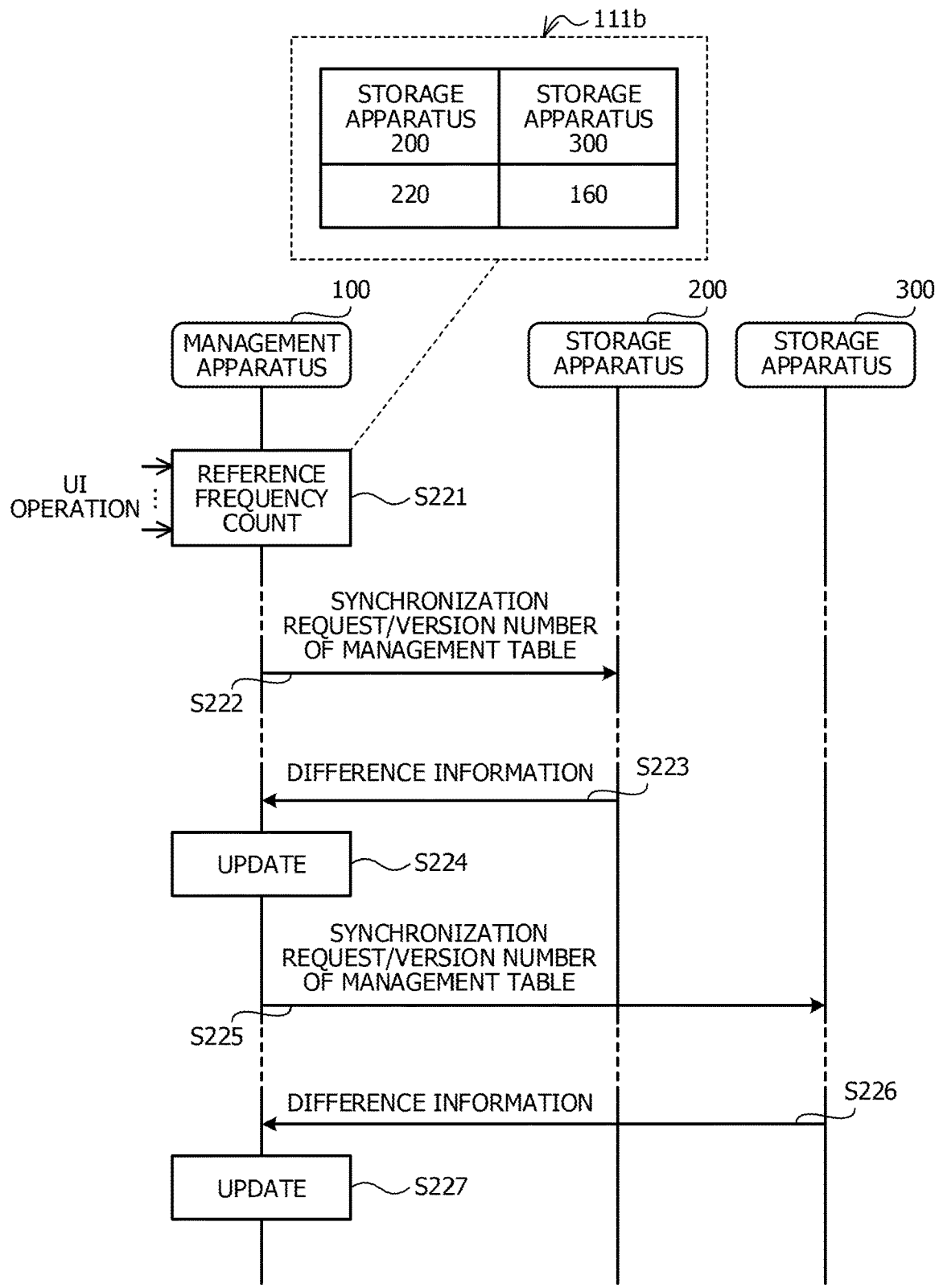
FIG. 19 is a sequence diagram depicting a flow of a synchronization process according to a modification to the second embodiment (example in which a priority degree between storage apparatus is taken into consideration).

Although the example of FIG. 18 takes the priority degree among hierarchies of resources into consideration, a modification in which the priority degree is provided between storage apparatus is described here with reference to FIG. 19. FIG. 19 is a sequence diagram depicting a flow of a synchronization process according to a modification to the second embodiment (example in which a priority degree between storage apparatus is taken into consideration)

(S221) The management apparatus 100 counts, by the display controlling unit 113, the reference frequency to the management UI 101*a* and accumulates the information as frequency information 111*b* into the storage unit 111.

For example, if the storage 202 of the storage apparatus 200 is selected on a registration storage list screen image (refer to FIG. 4) of the management UI 101*a* is selected, the display controlling unit 113 of the management apparatus 100 increments the count of the reference frequency to the storage apparatus 200. Further, if the storage 302 of the storage apparatus 300 is selected on a registration storage list screen image (refer to FIG. 4) of the management UI 101*a*, the display controlling unit 113 of the management apparatus 100 increments the count of the reference frequency to the storage apparatus 300.

(S222) The management apparatus 100 transmits, by the synchronization controlling unit 112, a synchronization request and information of the version number of the management table 102 to the storage apparatus 200. For example, the synchronization controlling unit 112 of the management apparatus 100 refers to the frequency information 111*b* upon a synchronization process such as upon activation of the management apparatus 100 to determine a storage apparatus of a transmission destination to which a synchronization request and the version number of the management table 102 are to be transmitted preferentially based on the reference frequency.

In the example of FIG. 19, the reference frequency of the storage apparatus 200 is 220, and the reference frequency of the storage apparatus 300 is 160. In this case, the synchronization controlling unit 112 of the management apparatus 100 determines the transmission destination, to which a synchronization request and the version number of the management table 102 are to be transmitted preferentially, to the storage apparatus 200. Then, the synchronization controlling unit 112 of the management apparatus 100 transmits a synchronization request and the version number of the management table 102 to the storage apparatus 200.

(S223, S224, S225) The storage apparatus 200 receiving the synchronization request and the version number of the management table 102 transmits, by the difference notification unit 214, the difference information 200b to the management apparatus 100. The management apparatus 100 receiving the difference information 200b updates, by the synchronization controlling unit 112, the management table 102 based on the difference information 200b. Then, the management apparatus 100 transmits, by the synchronization controlling unit 112, a synchronization request and the version number of the management table 102 to the storage apparatus 300 whose reference frequency is low in comparison with the storage apparatus 200.

(S226, S227) The storage apparatus 300 receiving the synchronization request and the version number of the management table 102 transmits difference information 300b to the management apparatus 100. The management apparatus 100 receiving the difference information 300b updates, by the synchronization controlling unit 112, the management table 102 based on the difference information 300b. When the process at S227 is completed, the series of processes depicted in FIG. 19 ends. By preferentially updating information of a storage apparatus having a higher reference frequency in such a manner as described above, the updating response of display information whose reference frequency is high is improved.

The second embodiment is such as described above.

All examples and conditional language recited herein are intended for pedagogical purposes to and the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus comprising:
   a memory; and
   a processor coupled to the memory and the processor configured to execute a process, the process including:
      storing, in the memory, management information including an operation history for a storage region of a storage device;
      specifying at certain timing, from the management information, a first operation that has been executed to set a configuration of the storage region to a configuration at the certain timing;
      determining a second operation from among operations, in the management information, that precede the execution of the first operation and that target the storage region;
      deleting the second operation from the management information; and
      transmitting the management information after the deletion to a management apparatus that manages a state of the storage region of the storage device, wherein the second operation is an operation that does not affect an operation result of the first operation, and the operation history indicates a plurality of operations applied to the storage region while communication between the storage control apparatus and the management apparatus is interrupted.

2. The storage control apparatus according to claim 1, wherein the first operation includes a deletion operation for deleting the storage region.

3. The storage control apparatus according to claim 2, wherein the second operation is a creation operation for creating the storage region.

4. The storage control apparatus according to claim 1, wherein
   the storage region includes a lower storage region; wherein
   the management information includes first information and second information, the first information indicating one or more operations targeting the storage region, the second information indicating one or more operations targeting the lower storage region; and wherein
   the transmitting transmits the first information earlier than the second information.

5. The storage control apparatus according to claim 1, wherein
   the storage region includes a lower storage region; wherein
   the management information includes first information and second information, the first information indicating one or more operations targeting the storage region, the second information indicating one or more operations targeting the lower storage region; and wherein
   the process further comprises receiving, from the management apparatus, frequency information that indicates a first frequency at which the first information is referenced and a second frequency at which the second information is referenced; wherein
   the transmitting transmits the first information earlier than the second information when the first frequency is higher than the second frequency; and wherein
   the transmitting transmits the second information earlier than the first information when the second frequency is higher than the first frequency.

6. A storage management system, comprising:
   a storage control apparatus including:
      a first memory; and
      a first processor coupled to the first memory and the first processor configured to execute a first process, the first process including:
         storing, in the first memory, first management information including an operation history for a storage region of a storage device;
         specifying at certain timing, from the first management information, a first operation that has been executed to set a configuration of the storage region to a configuration at the certain timing;
         determining a second operation from among operations, in the first management information, that precede the execution of the first operation and that target the storage region;
         deleting the second operation from the first management information; and
         transmitting the first management information after the deletion to a management apparatus that manages a state of the storage region of the storage device; and the management apparatus including:
- a second memory that stores second management information including an operation history for the storage region; and
- a second processor coupled to the second memory and the second processor configured to execute a second process, the second process including:
  - receiving the first management information after the deletion from the storage control apparatus; and
  - updating the second management information based on the received first management information,
  - wherein the second operation is an operation that does not affect an operation result of the first operation.

7. The storage management system according to claim 6, wherein
the storage management system comprises a plurality of the storage controlling apparatus; and wherein
the second process further comprises:
obtaining a reference frequency of the first management information for each of the plurality of the storage controlling apparatus; and
determining, based on the reference frequency, at least one of the plurality of the storage controlling apparatus from which the first management information after the deletion is to be preferentially transmitted.

8. A non-transitory computer-readable storage medium storing a program that causes a computer to execute a process, the computer including a memory, the process comprising:
storing, in the memory, management information including an operation history for a storage region of a storage device;
specifying at certain timing, from the management information, a first operation that has been executed to set a configuration of the storage region to a configuration at the certain timing;
determining a second operation from among operations, in the management information, that precede the execution of the first operation and that target the storage region;
deleting the second operation from the management information; and
transmitting the management information after the deletion to a management apparatus that manages a state of the storage region of the storage device,
wherein the second operation is an operation that does not affect an operation result of the first operation, and the operation history indicates a plurality of operations applied to the storage region while communication between a storage controlling apparatus and the management apparatus is interrupted.

* * * * *